United States Patent
Hong et al.

(10) Patent No.: US 12,200,674 B2
(45) Date of Patent: Jan. 14, 2025

(54) METHOD FOR OPERATING SIDELINK UE IN SLOT AGGREGATION IN WIRELESS COMMUNICATION SYSTEM

(71) Applicant: LG ELECTRONICS INC., Seoul (KR)

(72) Inventors: Uihyun Hong, Seoul (KR); Hanbyul Seo, Seoul (KR); Seungmin Lee, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 397 days.

(21) Appl. No.: 17/596,768

(22) PCT Filed: Jun. 18, 2020

(86) PCT No.: PCT/KR2020/007890
§ 371 (c)(1),
(2) Date: Dec. 17, 2021

(87) PCT Pub. No.: WO2020/256427
PCT Pub. Date: Dec. 24, 2020

(65) Prior Publication Data
US 2022/0322342 A1    Oct. 6, 2022

(30) Foreign Application Priority Data
Jun. 18, 2019 (KR) .......... 10-2019-0071997

(51) Int. Cl.
*H04W 72/04* (2023.01)
*H04W 72/0446* (2023.01)
*H04L 5/00* (2006.01)
*H04W 92/18* (2009.01)

(52) U.S. Cl.
CPC .......... *H04W 72/0446* (2013.01); *H04L 5/00* (2013.01); *H04W 92/18* (2013.01)

(58) Field of Classification Search
CPC ...... H04W 72/0446; H04W 92/18; H04L 5/00
See application file for complete search history.

(56) References Cited

U.S. PATENT DOCUMENTS

2020/0053675 A1\*  2/2020  Khoryaev ............... H04L 5/001
2020/0221423 A1\*  7/2020  Wang .................... H04W 72/02

FOREIGN PATENT DOCUMENTS

KR   10-2020-0036702   \*  4/2020  .......... H04L 1/1812
WO   2018174761           9/2018

OTHER PUBLICATIONS

Qualcomm Incorporated, "Considerations on Physical Layer aspects of NR V2X," 3GPP TSG-RAN WG1 Meeting #97, R1-1907269, May 2019, 17 pages.\*

(Continued)

*Primary Examiner* — Jungwon Chang
(74) *Attorney, Agent, or Firm* — LEE, HONG, DEGERMAN, KANG & WAIMEY

(57) ABSTRACT

One embodiment relates to a method for operating an RX UE in a wireless communication system, comprising the steps in which: the RX UE performs automatic gain control (AGC) in an aggregation set; and the RX UE receives a sidelink signal through the aggregation set, on the basis of the AGC, wherein the aggregation set starts from a predetermined slot related to the number of slots included in the aggregation set.

13 Claims, 46 Drawing Sheets

(56) References Cited

OTHER PUBLICATIONS

Fujitsu, "Considerations on HARQ-ACK feedback for NR-V2X unicast," 3GPP TSG-RAN WG1 Meeting #95, R1-1812411, Nov. 2018, 7 pages.*
MediaTek Inc., "Physical layer structure for NR sidelink," 3GPP TSG-RAN WG1 Meeting #94bis, R1-1810453, Sep. 2018, 11 pages.
Qualcomm Incorporated, "Sidelink Resource Allocation Mechanism for NR V2X," 3GPP TSG-RAN WG1 Ad-Hoc Meeting 1901, R1-1901307, Jan. 2019, 13 pages.
PCT International Application No. PCT/KR2020/007890, Written Opinion of the International Searching Authority dated Sep. 11, 2020, 17 pages.

* cited by examiner (a)

(b)

(a)

(b)

(a)

(b)

METHOD FOR OPERATING SIDELINK UE IN SLOT AGGREGATION IN WIRELESS COMMUNICATION SYSTEM

CROSS-REFERENCE TO RELATED APPLICATIONS

This application is the National Stage filing under 35 U.S.C. 371 of International Application No. PCT/KR2020/007890, filed on Jun. 18, 2020, which claims the benefit of earlier filing date and right of priority to Korean Patent Application No. 10-2019-0071997, filed on Jun. 18, 2019, the contents of which are all incorporated by reference herein in their entirety.

TECHNICAL FIELD

The present disclosure relates to a wireless communication system, and more particularly to a method and device for operating a sidelink user equipment (UE) when slot aggregation is applied to sidelink communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of the present disclosure is to provide a method for operating a sidelink UE when slot aggregation is applied to sidelink communication.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a method for operating a reception (RX) user equipment (UE) in a wireless communication system may include performing, by the RX UE, automatic gain control (AGC) in an aggregation set; and receiving, by the RX UE, a sidelink signal through the aggregation SET based on the AGC, wherein the aggregation set starts from a predetermined slot associated with the number of slots included in the aggregation set.

In accordance with another aspect of the present disclosure, a device for use in a wireless communication system may include at least one processor; and at least one computer memory operatively connected to the at least one processor, and configured to store instructions such that the at least one processor performs specific operations by executing the instructions, wherein the specific operations include performing, by the RX UE, automatic gain control (AGC) in an aggregation set; and receiving, by the RX UE, a sidelink signal through the aggregation SET based on the AGC, wherein the aggregation set starts from a predetermined slot associated with the number of slots included in the aggregation set.

The predetermined slot may be a slot corresponding to a multiple of 1/K (where K is a natural number) indicating the number of slots starting from the slot N.

The method may further include: based on a state in which data to be transmitted by the RX UE is generated in the aggregation set, performing TX/RX switching for transmission of the data when a predetermined condition is satisfied.

The predetermined condition may indicate that a ratio of a duration time starting from a start slot of the aggregation set to a slot where the data is generated to an entire time corresponding to the aggregation set is equal to or less than a predetermined threshold value.

A PSCCH in the aggregation set may be transmitted at an odd slot.

The PSCCH may include at least one of information indicating which one of PSCCHs in the aggregation set is used; the number of slots located before the PSCCH within the aggregation set; and the number of slots located after the PSCCH within the aggregation set.

In the aggregation set, an odd slot and an even slot may be configured to transmit different transport blocks (TBs).

The RX UE may be configured to communicate with at least one of another terminal, a terminal related to an autonomous vehicle, a base station (BS), and a network.

Advantageous Effects

As is apparent from the above description, the embodiments of the present disclosure can reduce ambiguity of the automatic gain control (AGC) operation, can reduce the number of AGC operations, can allow these resources to be used for data transmission, and can thus efficiently use resources.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

BEST MODE

In various embodiments of the present disclosure, "I" and "," should be interpreted as "and/or". For example, "A/B" may mean "A and/or B". Further, "A, B" may mean "A and/or B". Further, "AB/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
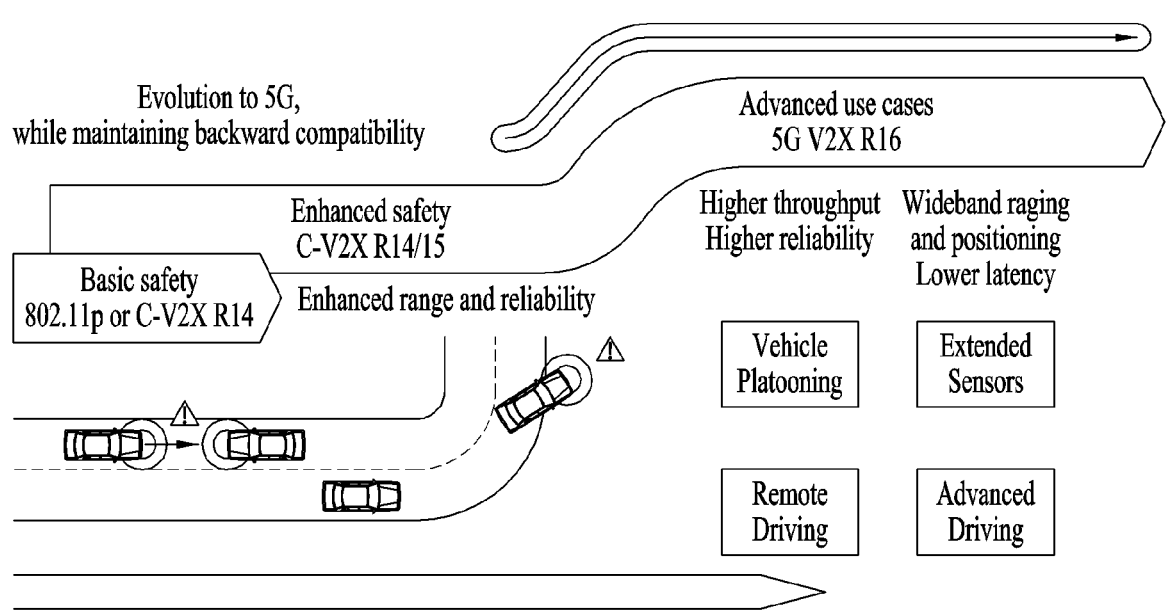
FIG. 1 is a diagram comparing vehicle-to-everything (V2X) communication based on pre-new radio access technology (pre-NR) with V2X communication based on NR.
Figure 2:
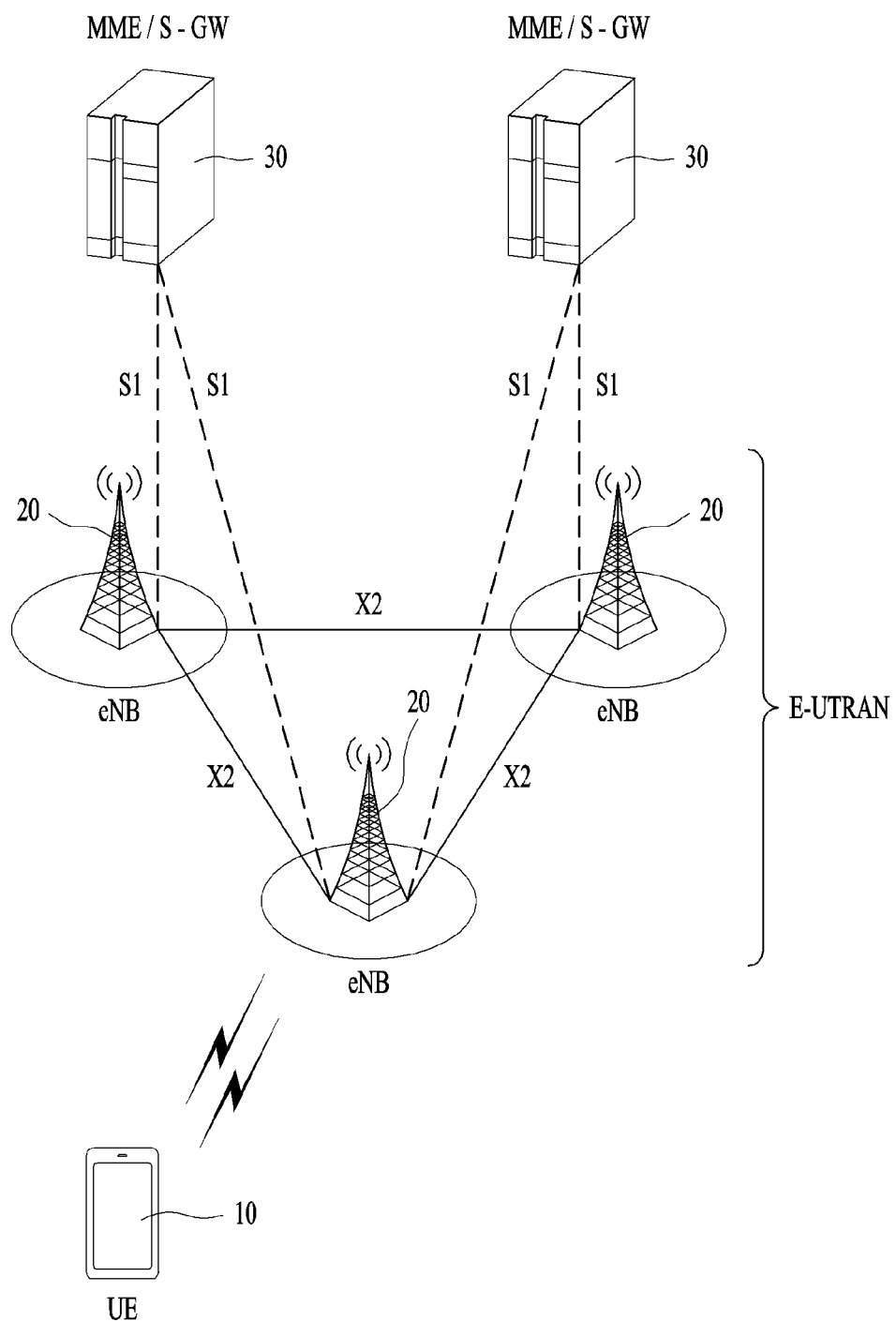
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
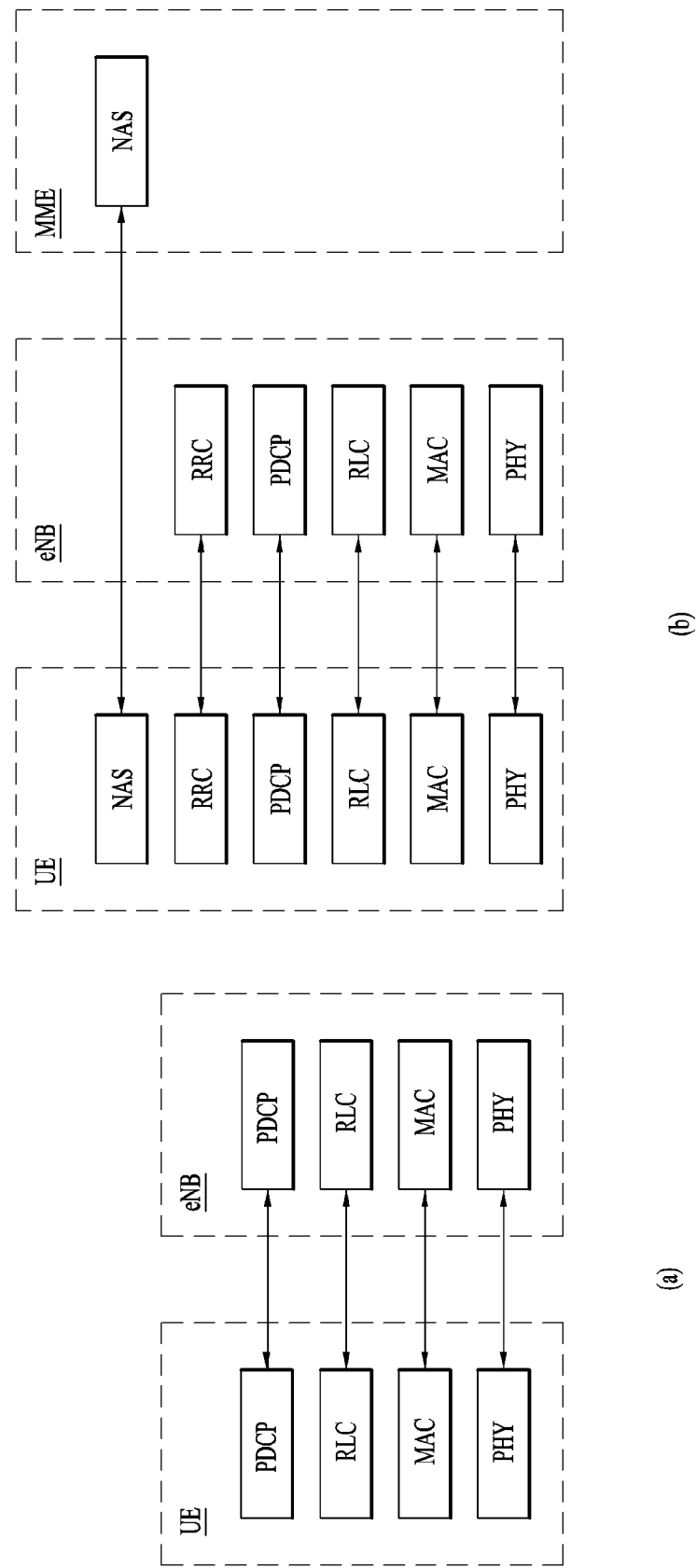
FIG. 3 is a diagram illustrating user-plane and control-plane radio protocol architectures according to an embodiment of the present disclosure.

FIG. 3(a) illustrates a user-plane radio protocol architecture according to an embodiment of the disclosure.

FIG. 3(b) illustrates a control-plane radio protocol architecture according to an embodiment of the disclosure. A user plane is a protocol stack for user data transmission, and a control plane is a protocol stack for control signal transmission.

Referring to FIGS. 3(a) and 3(b), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is an L1/L2 control channel. A transmission time interval (TTI) is a unit time for subframe transmission.

Figure 4:
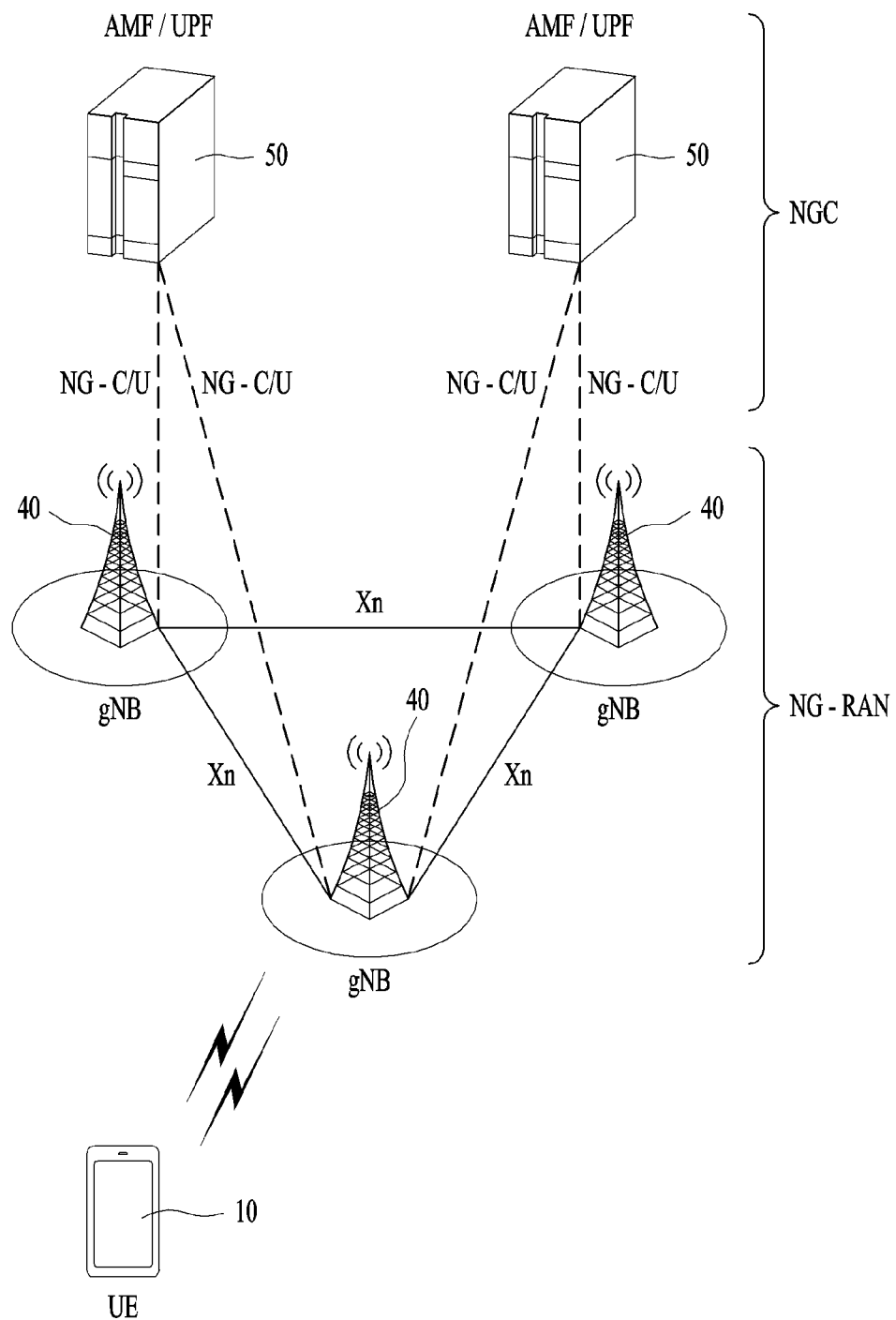
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
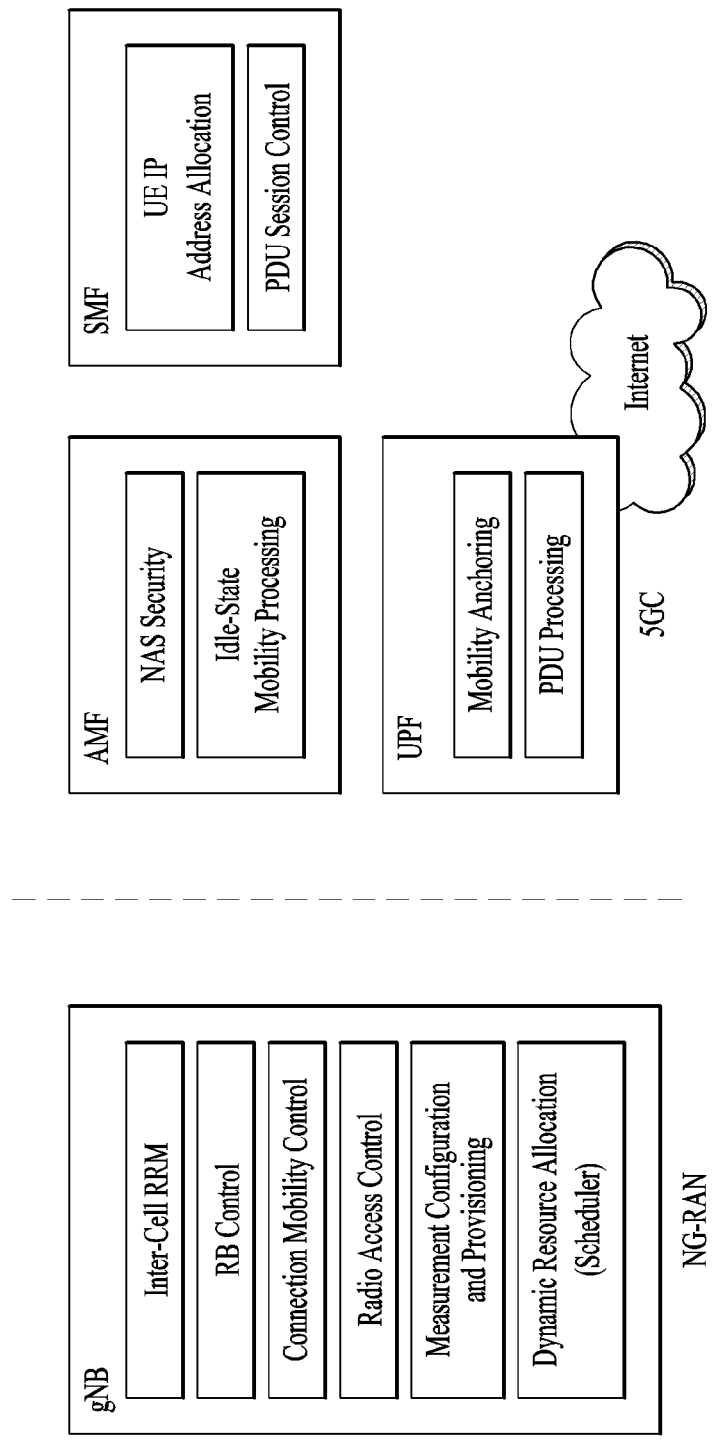
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
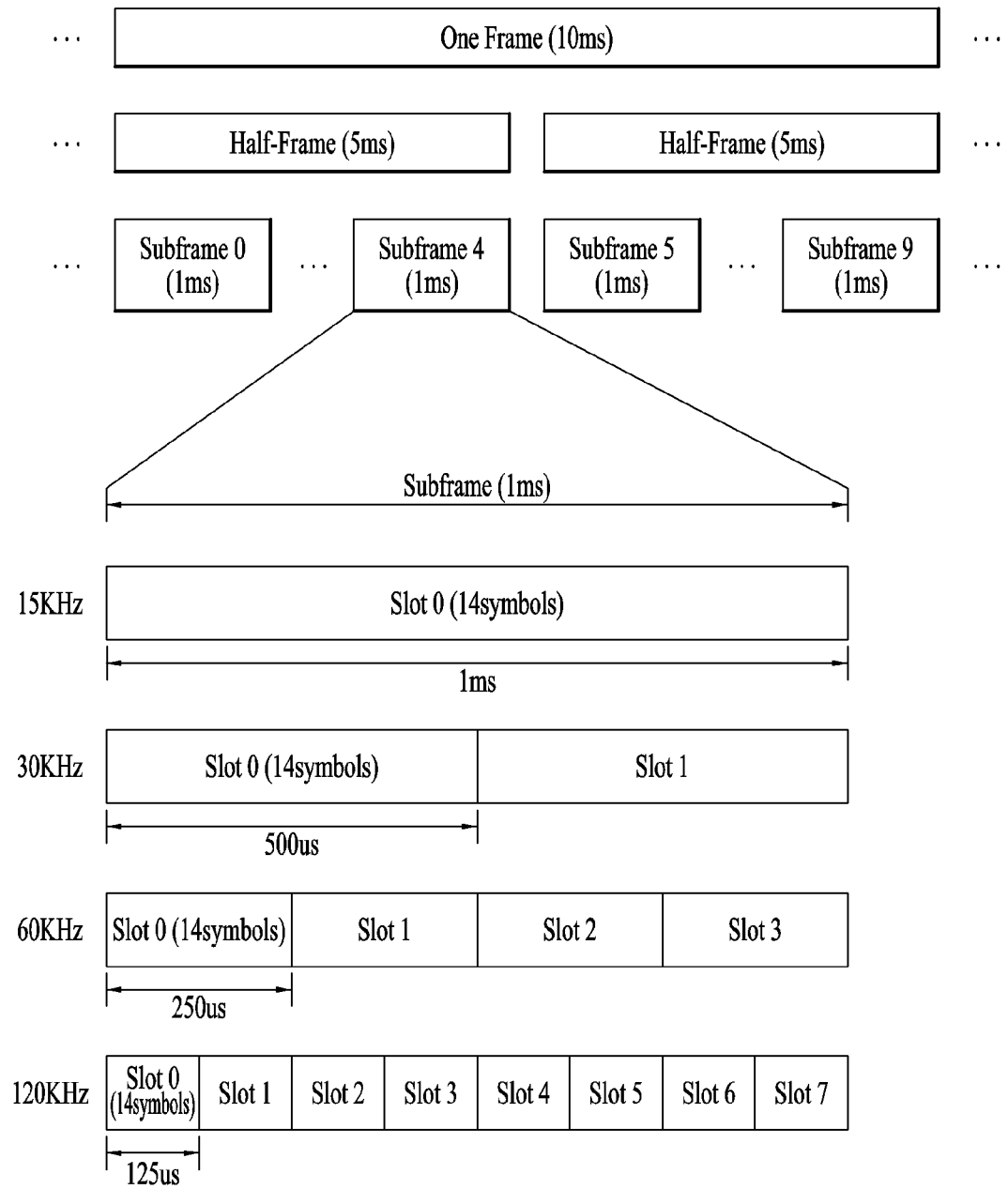
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

[Table 1] below lists the number of symbols per slot Nslotsymb, the number of slots per frame Nframe,uslot, and the number of slots per subframe Nsubframe,uslot according to an SCS configuration μ in the NCP case.

TABLE 1

| SCS (15*2u) | $N_{symb}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

[Table 2] below lists the number of symbols per slot, the number of slots per frame, and the number of slots per subframe according to an SCS in the ECP case.

TABLE 2

| SCS (15*2^u) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
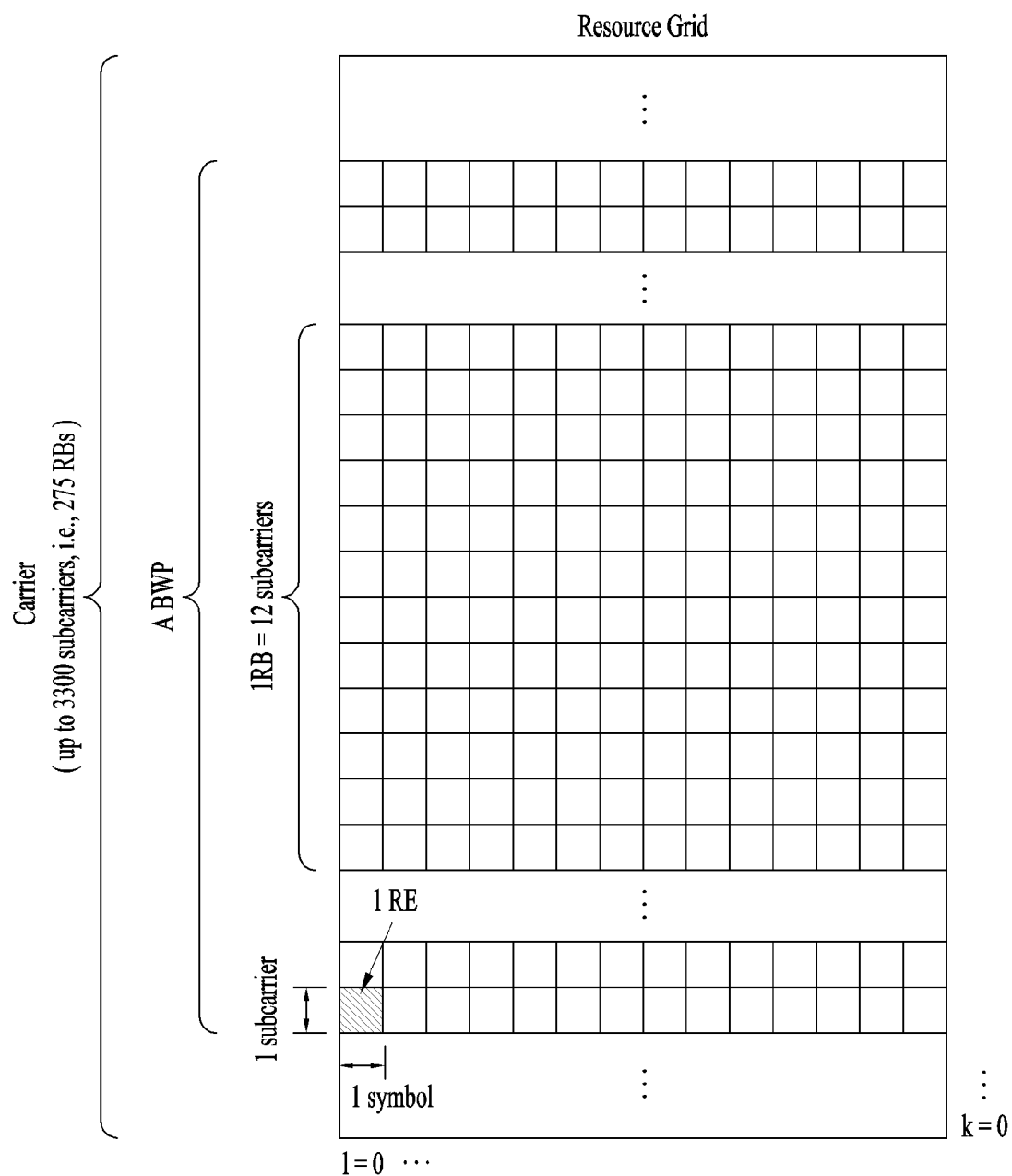
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
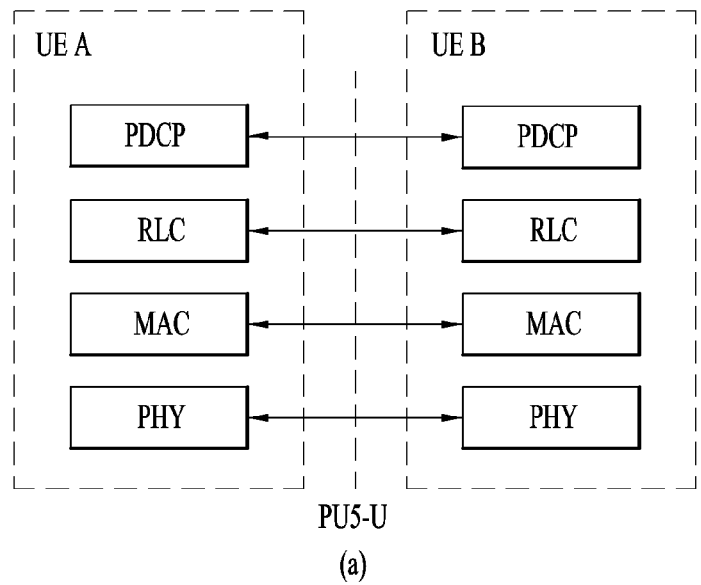
FIG. 8 is a diagram illustrating radio protocol architectures for sidelink (SL) communication according to an embodiment of the present disclosure.
Figure 8:
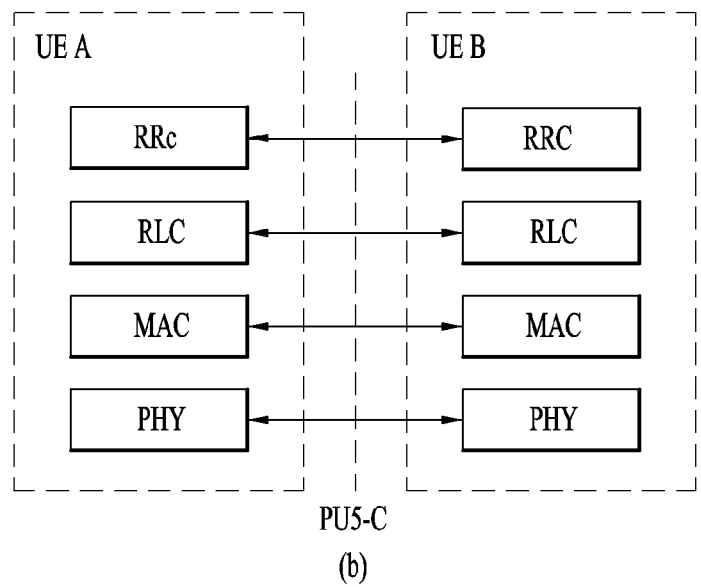

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
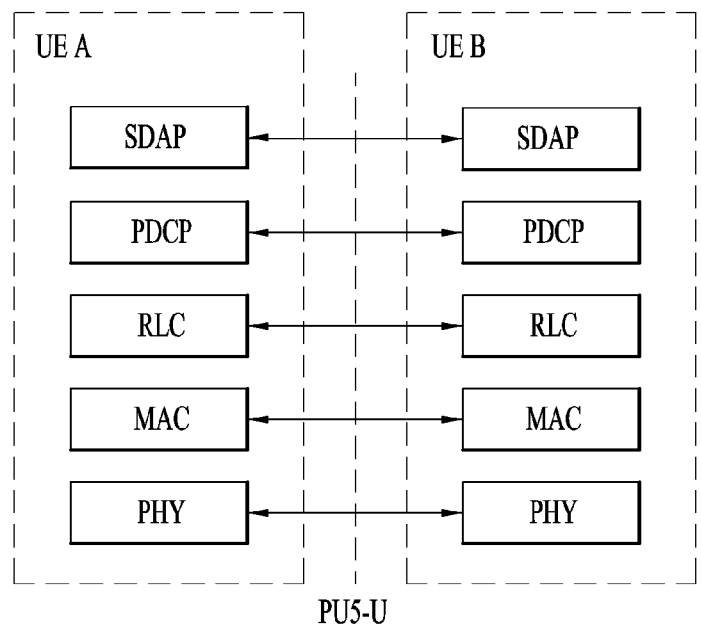
FIG. 9 is a diagram illustrating radio protocol architectures for SL communication according to an embodiment of the present disclosure.
Figure 9:
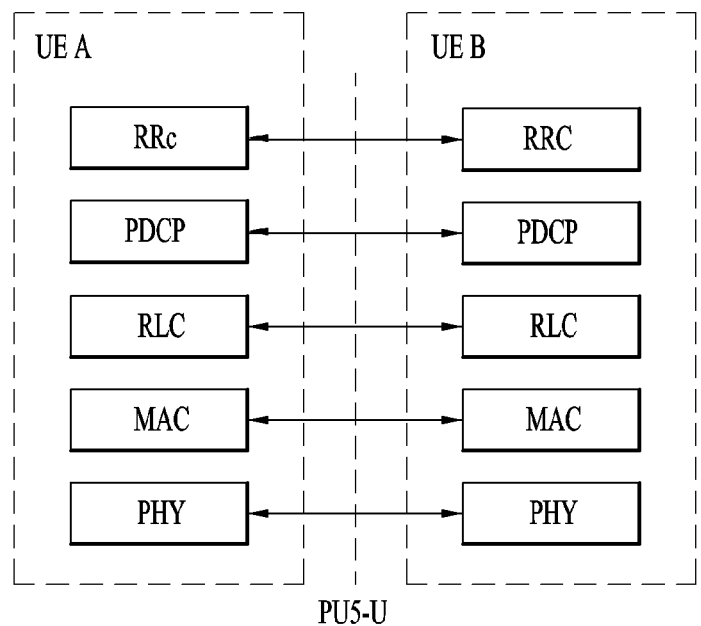

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Sidelink synchronization signals (SLSSs) and synchronization information will be described below.

The SLSSs, which are SL-specific sequences, may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold-sequences may be used for the S-SSS. For example, the UE may detect an initial signal and acquire synchronization by using the S-PSS. For example, the UE may acquire fine synchronization and detect a synchronization signal ID, by using the S-PSS and the S-SSS.

A physical sidelink broadcast channel (PSBCH) may be a (broadcast) channel carrying basic (system) information that the UE needs to first know before transmitting and receiving an SL signal. For example, the basic information may include information related to the SLSSs, duplex mode (DM) information, time division duplex (TDD) UL/DL (UL/DL) configuration information, resource pool-related information, information about the type of an application related to the SLSSs, subframe offset information, broadcast information, and so on. For example, the payload size of the PSBCH may be 56 bits, including a 24-bit cyclic redundancy check (CRC), for evaluation of PSBCH performance in NR V2X.

The S-PSS, S-SSS, and PSBCH may be included in a block format (e.g., SL synchronization signal (SL SS)/PSBCH block, hereinafter, referred to as sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in a carrier, and the transmission bandwidth of the S-SSB may be within a (pre)configured SL BWP. For example, the bandwidth of the S-SSB may be 11 RBs. For example, the PSBCH may span 11 RBs. The frequency position of the S-SSB may be (pre)set. Therefore, the UE does not need to perform hypothesis detection in a frequency to discover the S-SSB in the carrier.

In the NR SL system, a plurality of numerologies including different SCSs and/or CP lengths may be supported. As an SCS increases, the length of a time resource for S-SSB transmission of a UE may be shortened. Accordingly, in order to ensure coverage of the S-SSB, a transmitting UE may transmit one or more S-SSBs to a receiving terminal within one S-SSB transmission period according to the SCS. For example, the number of S-SSBs that the transmitting terminal transmits to the receiving terminal within one S-SSB transmission period may be pre-configured or configured for the transmitting UE. For example, the S-SSB transmission period may be 160 ms. For example, for all SCSs, an S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two or four S-SSBs to the receiving UE within one S-SSB transmission period.

For example, when the SCS is 60 kHz in FR2, the transmitting UE may transmit 1, 2, 4, 8, 16, or 32 S-SSBs to the receiving UE within one S-SSB transmission period. For example, when the SCS is 120 kHz in FR2, the transmitting UE may transmit 1, 2, 4, 8, 16, 32, or 64 S-SSBs to the receiving UE within one S-SSB transmission period.

When the SCS is 60 kHz, two types of CPs may be supported. Further, the structure of an S-SSB transmitted by the transmitting UE to the receiving UE may be different according to a CP type. For example, the CP type may be an NCP or an ECP. Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol of the S-SSB transmitted by the transmitting UE. For example, upon receipt of the S-SSB, the receiving UE may perform an automatic gain control (AGC) operation in the first symbol period of the S-SSB.

Figure 10:
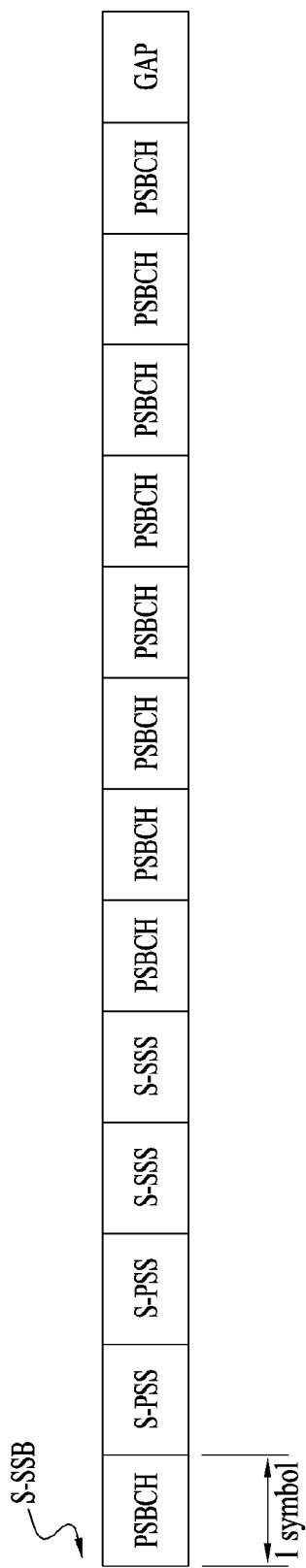
FIG. 10 is a diagram illustrating the structure of a secondary synchronization signal block (S-SSB) in a normal cyclic prefix (NCP) case according to an embodiment of the present disclosure.

FIG. 10 illustrates the structure of an S-SSB in an NCP case according to an embodiment of the present disclosure.

For example, when the CP type is NCP, FIG. 10 may be referred to for the structure of the S-SSB, that is the order of symbols to which the S-PSS, S-SSS and PSBCH are mapped in the S-SSB transmitted by the transmitting UE.

Figure 11:
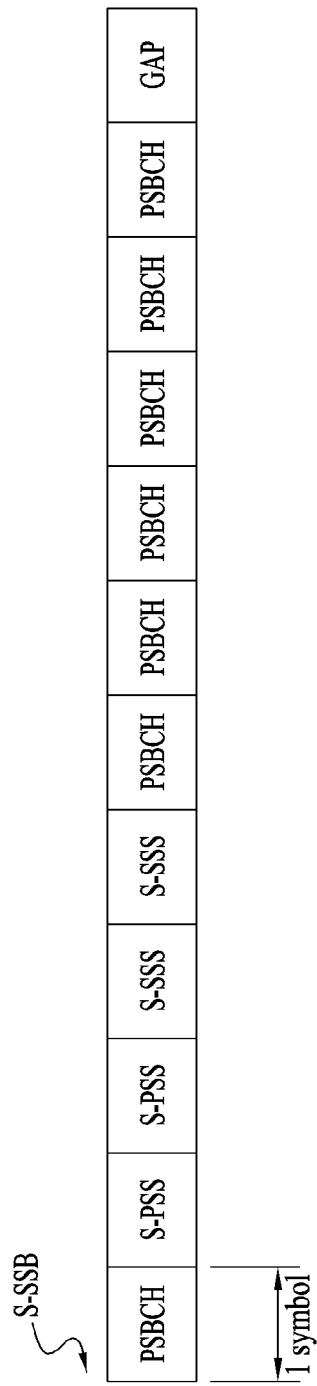
FIG. 11 is a diagram illustrating the structure of an S-SSB in an extended cyclic prefix (ECP) case according to an embodiment of the present disclosure.

FIG. 11 illustrates the structure of an S-SSB in an ECP case according to an embodiment of the present disclosure.

In the ECP case, for example, the number of symbols to which the PSBCH is mapped after the S-SSS in the S-SSB may be 6, unlike FIG. 10. Therefore, the coverage of the S-SSB may be different depending on whether the CP type is NCP or ECP.

Each SLSS may have a sidelink synchronization identifier (SLSS ID).

For example, in LTE SL or LTE V2X, the values of SLSS IDs may be defined based on combinations of two different S-PSS sequences and 168 different S-SSS sequences. For example, the number of SLSS IDs may be 336. For example, the value of an SLSS ID may be any one of 0 to 335.

For example, in NR SL or NR V2X, the values of SLSS IDs may be defined based on combinations of two different S-PSS sequences and 336 different S-SSS sequences. For example, the number of SLSS IDs may be 672. For example, the value of an SLSS ID may be any one of 0 to 671. For example, one of the two different S-PSSs may be associated with in-coverage and the other S-PSS may be associated with out-of-coverage. For example, the SLSS ID of 0 to 335 may be used for in-coverage, whereas the SLSS IDs of 336 to 671 may be used for out-coverage.

In order to improve the S-SSB reception performance of the receiving UE, the transmitting UE needs to optimize transmission power according to the characteristics of each signal included in the S-SSB. For example, the transmitting UE may determine a maximum power reduction (MPR) value for each signal included in the S-SSB according to the peak-to-average power ratio (PAPR) of the signal. For example, when the PAPR value is different between the S-PSS and the S-SSS in the S-SSB, the transmitting UE may apply an optimal MPR value to each of the S-PSS and the S-SSS to improve the S-SSB reception performance of the receiving UE. For example, a transition period may further be applied so that the transmitting UE performs an amplification operation for each signal. The transition period may preserve a time required for a transmission-end amplifier of the transmitting UE to perform a normal operation at the boundary at which the transmission power of the transmitting UE is changed. For example, the transition period may be 10 us in FR1, and 5 us in FR2. For example, a search window in which the receiving UE detects the S-PSS may be 80 ms and/or 160 ms.

Figure 12:
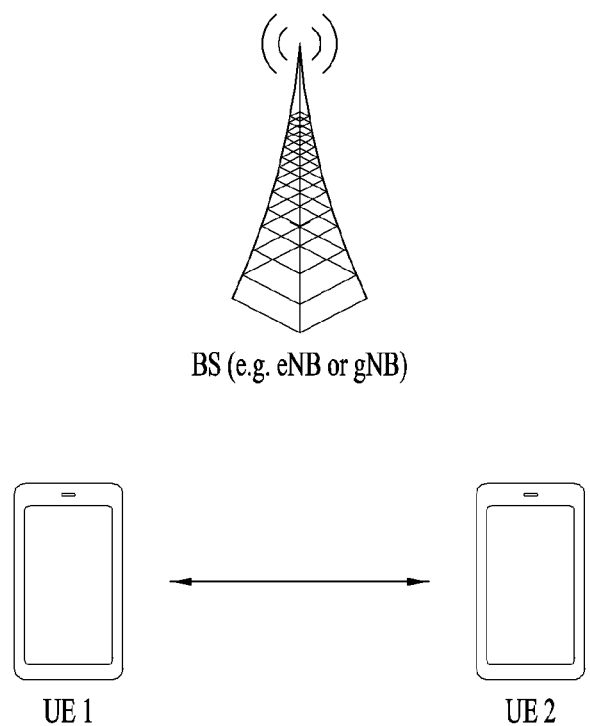
FIG. 12 is a diagram illustrating user equipments (UEs) which conduct V2X or SL communication between them according to an embodiment of the present disclosure.

FIG. 12 illustrates UEs that conduct V2X or SL communication between them according to an embodiment of the present disclosure.

Referring to FIG. 12, the term "UE" in V2X or SL communication may mainly refer to a terminal of a user. However, when network equipment such as a BS transmits and receives a signal according to a UE-to-UE communication scheme, the BS may also be regarded as a kind of UE.

For example, a first UE (UE1) may be a first device 100 and a second UE (UE2) may be a second device 200.

For example, UE1 may select a resource unit corresponding to specific resources in a resource pool which is a set of resources. UE1 may then transmit an SL signal in the resource unit. For example, UE2, which is a receiving UE, may be configured with the resource pool in which UE1 may transmit a signal, and detect the signal from UE1 in the resource pool.

When UE1 is within the coverage of the BS, the BS may indicate the resource pool to UE1. On the contrary, when UE1 is outside the coverage of the BS, another UE may indicate the resource pool to UE1, or UE1 may use a predetermined resource pool.

In general, a resource pool may include a plurality of resource units, and each UE may select one or more resource units and transmit an SL signal in the selected resource units.

Figure 13:
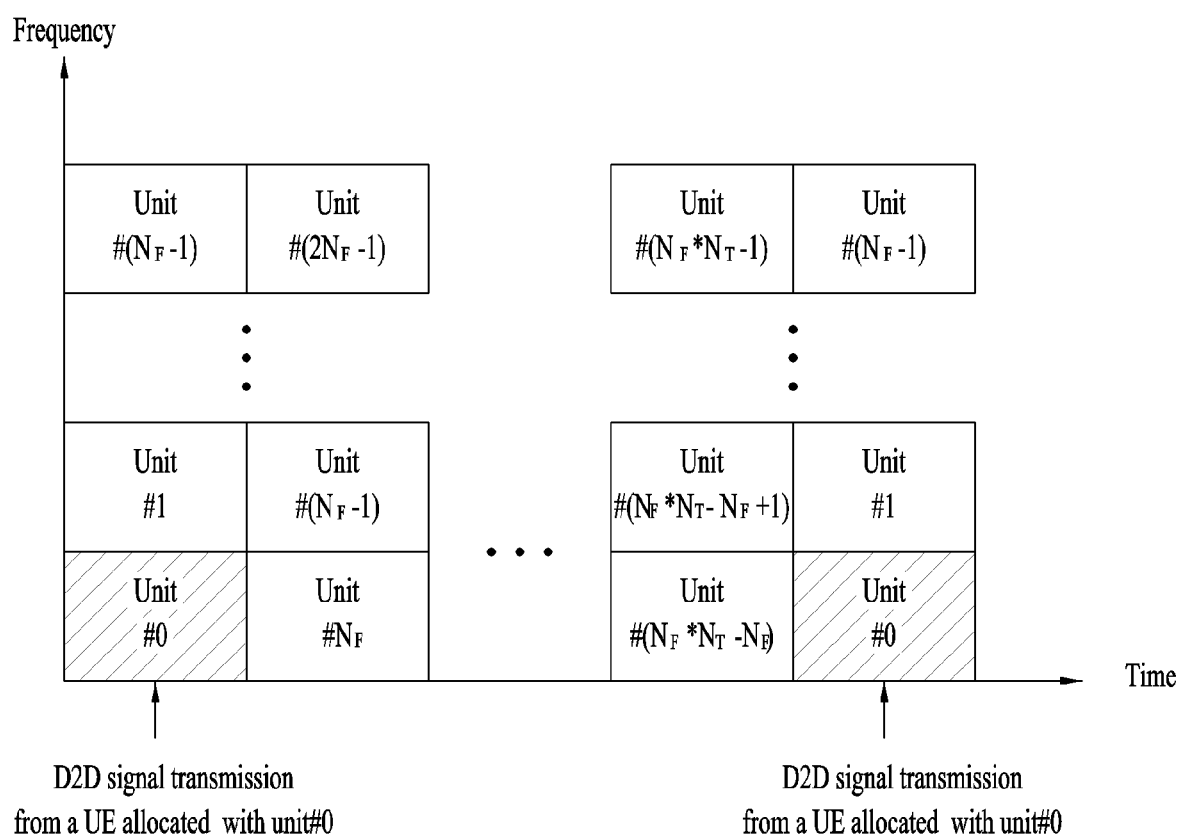
FIG. 13 is diagram illustrating resource units for V2X or SL communication according to an embodiment of the present disclosure.

FIG. 13 illustrates resource units for V2X or SL communication according to an embodiment of the present disclosure.

Referring to FIG. 13, the total frequency resources of a resource pool may be divided into NF frequency resources, and the total time resources of the resource pool may be divided into NT time resources. Thus, a total of NF*NT resource units may be defined in the resource pool. FIG. 13 illustrates an example in which the resource pool is repeated with a periodicity of NT subframes.

As illustrates in FIG. 13, one resource unit (e.g., Unit #0) may appear repeatedly with a periodicity. Alternatively, to achieve a diversity effect in the time or frequency domain, the index of a physical resource unit to which one logical resource unit is mapped may change over time in a predetermined pattern. In the resource unit structure, a resource pool may refer to a set of resource units available to a UE for transmission of an SL signal.

Resource pools may be divided into several types. For example, each resource pool may be classified as follows according to the content of an SL signal transmitted in the resource pool.

(1) A scheduling assignment (SA) may be a signal including information about the position of resources used for a transmitting UE to transmit an SL data channel, a modulation and coding scheme (MCS) or multiple input multiple output (MIMO) transmission scheme required for data channel demodulation, a timing advertisement (TA), and so on. The SA may be multiplexed with the SL data in the same resource unit, for transmission. In this case, an SA resource pool may refer to a resource pool in which an SA is multiplexed with SL data, for transmission. The SA may be referred to as an SL control channel.

(2) An SL data channel (PSSCH) may be a resource pool used for a transmitting UE to transmit user data. When an SA is multiplexed with SL data in the same resource unit, for transmission, only the SL data channel except for SA information may be transmitted in a resource pool for the SL data channel. In other words, REs used to transmit the SA information in an individual resource unit in an SA resource pool may still be used to transmit SL data in the resource pool of the SL data channel. For example, the transmitting UE may transmit the PSSCH by mapping the PSSCH to consecutive PRBs.

(3) A discovery channel may be a resource pool used for a transmitting UE to transmit information such as its ID. The transmitting UE may enable a neighboring UE to discover itself on the discovery channel.

Even when SL signals have the same contents as described above, different resource pools may be used according to the transmission/reception properties of the SL signals. For example, in spite of the same SL data channel or discovery message, a different resources pool may be used for an SL signal according to a transmission timing determination scheme for the SL signal (e.g., whether the SL signal is transmitted at a reception time of a synchronization reference signal (RS) or at a time resulting from applying a predetermined TA to the reception time), a resource allocation scheme for the SL signal (e.g., whether a BS allocates transmission resources of an individual signal to an individual transmitting UE or whether the individual transmitting UE selects its own individual signal transmission resources in the resource pool), the signal format of the SL signal (e.g., the number of symbols occupied by each SL signal in one subframe, or the number of subframes used for transmission of one SL signal), the strength of a signal from the BS, the transmission power of the SL UE, and so on.

Resource allocation in SL will be described below.

Figure 14:
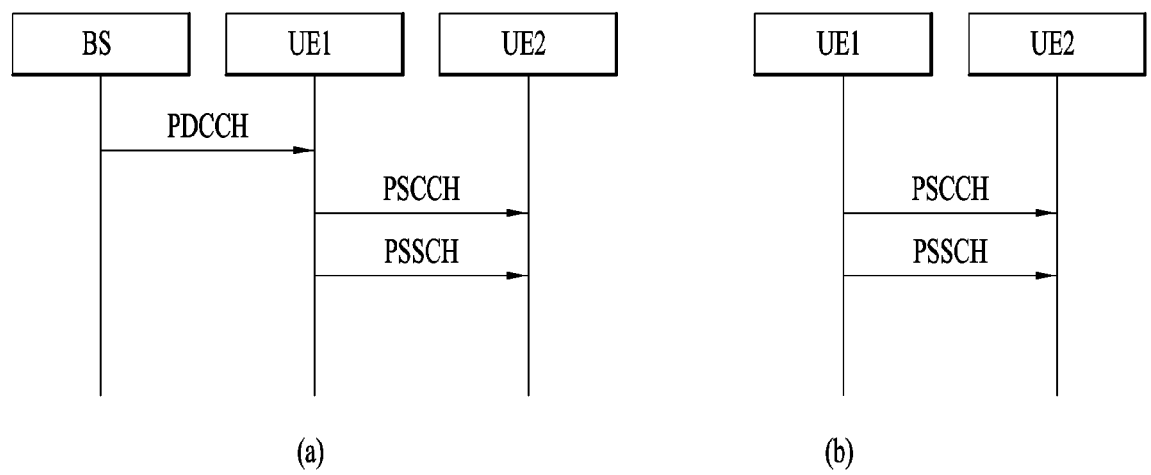
FIG. 14 is a diagram illustrating signal flows for V2X or SL communication procedures of a UE according to transmission modes according to an embodiment of the present disclosure.

FIG. 14 illustrates a procedure of performing V2X or SL communication according to a transmission mode in a UE according to an embodiment of the present disclosure. In various embodiments of the present disclosure, a transmission mode may also be referred to as a mode or a resource allocation mode. For the convenience of description, a transmission mode in LTE may be referred to as an LTE transmission mode, and a transmission mode in NR may be referred to as an NR resource allocation mode.

For example, FIG. 14(a) illustrates a UE operation related to LTE transmission mode 1 or LTE transmission mode 3. Alternatively, for example, FIG. 14(a) illustrates a UE operation related to NR resource allocation mode 1. For example, LTE transmission mode 1 may be applied to general SL communication, and LTE transmission mode 3 may be applied to V2X communication.

For example, FIG. 14(b) illustrates a UE operation related to LTE transmission mode 2 or LTE transmission mode 4. Alternatively, for example, FIG. 14(b) illustrates a UE operation related to NR resource allocation mode 2.

Referring to FIG. 14(a), in LTE transmission mode 1, LTE transmission mode 3, or NR resource allocation mode 1, a BS may schedule SL resources to be used for SL transmission of a UE. For example, the BS may perform resource scheduling for UE1 through a PDCCH (more specifically, DL control information (DCI)), and UE1 may perform V2X or SL communication with UE2 according to the resource scheduling. For example, UE1 may transmit sidelink control information (SCI) to UE2 on a PSCCH, and then transmit data based on the SCI to UE2 on a PSSCH.

For example, in NR resource allocation mode 1, a UE may be provided with or allocated resources for one or more SL transmissions of one transport block (TB) by a dynamic grant from the BS. For example, the BS may provide the UE with resources for transmission of a PSCCH and/or a PSSCH by the dynamic grant. For example, a transmitting UE may report an SL hybrid automatic repeat request (SL HARQ) feedback received from a receiving UE to the BS. In this case, PUCCH resources and a timing for reporting the SL HARQ feedback to the BS may be determined based on an indication in a PDCCH, by which the BS allocates resources for SL transmission.

For example, the DCI may indicate a slot offset between the DCI reception and a first SL transmission scheduled by the DCI. For example, a minimum gap between the DCI that schedules the SL transmission resources and the resources of the first scheduled SL transmission may not be smaller than a processing time of the UE.

For example, in NR resource allocation mode 1, the UE may be periodically provided with or allocated a resource set for a plurality of SL transmissions through a configured grant from the BS. For example, the grant to be configured may include configured grant type 1 or configured grant type 2. For example, the UE may determine a TB to be transmitted in each occasion indicated by a given configured grant.

For example, the BS may allocate SL resources to the UE in the same carrier or different carriers.

For example, an NR gNB may control LTE-based SL communication. For example, the NR gNB may transmit NR DCI to the UE to schedule LTE SL resources. In this case, for example, a new RNTI may be defined to scramble the NR DCI. For example, the UE may include an NR SL module and an LTE SL module.

For example, after the UE including the NR SL module and the LTE SL module receives NR SL DCI from the gNB, the NR SL module may convert the NR SL DCI into LTE DCI type 5A, and transmit LTE DCI type 5A to the LTE SL module every Xms. For example, after the LTE SL module receives LTE DCI format 5A from the NR SL module, the LTE SL module may activate and/or release a first LTE subframe after Z ms. For example, X may be dynamically indicated by a field of the DCI. For example, a minimum value of X may be different according to a UE capability. For example, the UE may report a single value according to its UE capability. For example, X may be positive.

Referring to FIG. 14(b), in LTE transmission mode 2, LTE transmission mode 4, or NR resource allocation mode 2, the UE may determine SL transmission resources from among SL resources preconfigured or configured by the BS/network. For example, the preconfigured or configured SL resources may be a resource pool. For example, the UE may autonomously select or schedule SL transmission resources. For example, the UE may select resources in a configured resource pool on its own and perform SL communication in the selected resources. For example, the UE may select resources within a selection window on its own by a sensing and resource (re)selection procedure. For example, the sensing may be performed on a subchannel basis UE1, which has autonomously selected resources in a resource pool, may transmit SCI to UE2 on a PSCCH and then transmit data based on the SCI to UE2 on a PSSCH.

For example, a UE may help another UE with SL resource selection. For example, in NR resource allocation mode 2, the UE may be configured with a grant configured for SL transmission. For example, in NR resource allocation mode 2, the UE may schedule SL transmission for another UE. For example, in NR resource allocation mode 2, the UE may reserve SL resources for blind retransmission.

For example, in NR resource allocation mode 2, UE1 may indicate the priority of SL transmission to UE2 by SCI. For example, UE2 may decode the SCI and perform sensing and/or resource (re)selection based on the priority. For example, the resource (re)selection procedure may include identifying candidate resources in a resource selection window by UE2 and selecting resources for (re)transmission from among the identified candidate resources by UE2. For example, the resource selection window may be a time interval during which the UE selects resources for SL transmission. For example, after UE2 triggers resource (re)selection, the resource selection window may start at T1≥0, and may be limited by the remaining packet delay budget of UE2. For example, when specific resources are indicated by the SCI received from UE1 by the second UE and an L1 SL reference signal received power (RSRP) measurement of the specific resources exceeds an SL RSRP threshold in the step of identifying candidate resources in the resource selection window by UE2, UE2 may not determine the specific resources as candidate resources. For example, the SL RSRP threshold may be determined based on the priority of SL transmission indicated by the SCI received from UE1 by UE2 and the priority of SL transmission in the resources selected by UE2.

For example, the L1 SL RSRP may be measured based on an SL demodulation reference signal (DMRS). For example, one or more PSSCH DMRS patterns may be configured or preconfigured in the time domain for each resource pool. For example, PDSCH DMRS configuration type 1 and/or type 2 may be identical or similar to a PSSCH DMRS pattern in the frequency domain. For example, an accurate DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, the transmitting UE may perform initial transmission of a TB without reservation based on the sensing and resource (re)selection procedure. For example, the transmitting UE may reserve SL resources for initial transmission of a second TB using SCI associated with a first TB based on the sensing and resource (re)selection procedure.

For example, in NR resource allocation mode 2, the UE may reserve resources for feedback-based PSSCH retransmission through signaling related to a previous transmission of the same TB. For example, the maximum number of SL resources reserved for one transmission, including a current transmission, may be 2, 3 or 4. For example, the maximum number of SL resources may be the same regardless of whether HARQ feedback is enabled. For example, the maximum number of HARQ (re)transmissions for one TB may be limited by a configuration or preconfiguration. For example, the maximum number of HARQ (re)transmissions may be up to 32. For example, if there is no configuration or preconfiguration, the maximum number of HARQ (re)transmissions may not be specified. For example, the configuration or preconfiguration may be for the transmitting UE. For example, in NR resource allocation mode 2, HARQ feedback for releasing resources which are not used by the UE may be supported.

For example, in NR resource allocation mode 2, the UE may indicate one or more subchannels and/or slots used by the UE to another UE by SCI. For example, the UE may indicate one or more subchannels and/or slots reserved for PSSCH (re)transmission by the UE to another UE by SCI. For example, a minimum allocation unit of SL resources may be a slot. For example, the size of a subchannel may be configured or preconfigured for the UE.

SCI will be described below.

While control information transmitted from a BS to a UE on a PDCCH is referred to as DCI, control information transmitted from one UE to another UE on a PSCCH may be referred to as SCI. For example, the UE may know the starting symbol of the PSCCH and/or the number of symbols in the PSCCH before decoding the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) on the PSCCH and/or PSSCH to the receiving UE. The receiving UE may decode the two consecutive SCIs (e.g., 2-stage SCI) to receive the PSSCH from the transmitting UE. For example, when SCI configuration fields are divided into two groups in consideration of a (relatively) large SCI payload size, SCI including a first SCI configuration field group is referred to as first SCI. SCI including a second SCI configuration field group may be referred to as second SCI. For example, the transmitting UE may transmit the first SCI to the receiving UE on the PSCCH. For example, the transmitting UE may transmit the second SCI to the receiving UE on the PSCCH and/or PSSCH. For example, the second SCI may be transmitted to the receiving UE on an (independent) PSCCH or on a PSSCH in which the second SCI is piggybacked to data. For example, the two consecutive SCIs may be applied to different transmissions (e.g., unicast, broadcast, or groupcast).

For example, the transmitting UE may transmit all or part of the following information to the receiving UE by SCI. For example, the transmitting UE may transmit all or part of the following information to the receiving UE by first SCI and/or second SCI.

- PSSCH-related and/or PSCCH-related resource allocation information, for example, the positions/number of time/frequency resources, resource reservation information (e.g. a periodicity), and/or
- an SL channel state information (CSI) report request indicator or SL (L1) RSRP (and/or SL (L1) reference signal received quality (RSRQ) and/or SL (L1) received signal strength indicator (RSSI)) report request indicator, and/or
- an SL CSI transmission indicator (on PSSCH) (or SL (L1) RSRP (and/or SL (L1) RSRQ and/or SL (L1) RSSI) information transmission indicator), and/or
- MCS information, and/or
- transmission power information, and/or
- L1 destination ID information and/or L1 source ID information, and/or
- SL HARQ process ID information, and/or
- new data indicator (NDI) information, and/or
- redundancy version (RV) information, and/or
- QoS information (related to transmission traffic/packet), for example, priority information, and/or
- an SL CSI-RS transmission indicator or information about the number of SL CSI-RS antenna ports (to be transmitted);
- location information about a transmitting UE or location (or distance area) information about a target receiving UE (requested to transmit an SL HARQ feedback), and/or
- RS (e.g., DMRS or the like) information related to decoding and/or channel estimation of data transmitted on a PSSCH, for example, information related to a pattern of (time-frequency) mapping resources of the DMRS, rank information, and antenna port index information.

For example, the first SCI may include information related to channel sensing. For example, the receiving UE may decode the second SCI using the PSSCH DMRS. A polar code used for the PDCCH may be applied to the second SCI. For example, the payload size of the first SCI may be equal for unicast, groupcast and broadcast in a resource pool. After decoding the first SCI, the receiving UE does not need to perform blind decoding on the second SCI. For example, the first SCI may include scheduling information about the second SCI.

In various embodiments of the present disclosure, since the transmitting UE may transmit at least one of the SCI, the first SCI, or the second SCI to the receiving UE on the PSCCH, the PSCCH may be replaced with at least one of the SCI, the first SCI, or the second SC. Additionally or alternatively, for example, the SCI may be replaced with at least one of the PSCCH, the first SCI, or the second SCI. Additionally or alternatively, for example, since the transmitting UE may transmit the second SCI to the receiving UE on the PSSCH, the PSSCH may be replaced with the second SCI.

Figure 15:
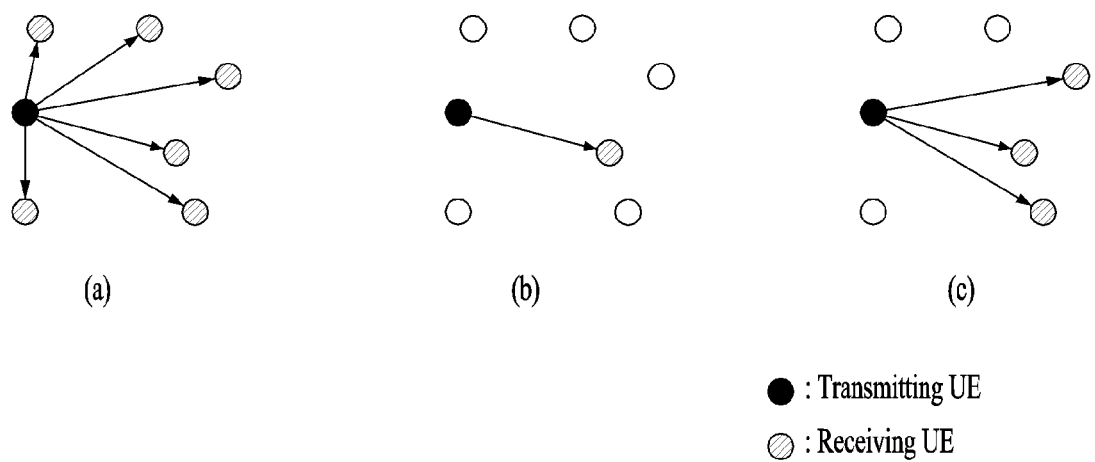
FIG. 15 is a diagram illustrating three cast types according to an embodiment of the present disclosure.

FIG. 15 illustrates three cast types according to an embodiment of the present disclosure.

Specifically, FIG. 15(a) illustrates broadcast-type SL communication, FIG. 15(b) illustrates unicast-type SL communication, and FIG. 15(c) illustrates groupcast-type SL communication. In unicast-type SL communication, a UE may perform one-to-one communication with another UE. In groupcast-type SL communication, the UE may perform SL communication with one or more UEs of a group to which the UE belongs. In various embodiments of the present disclosure, SL groupcast communication may be replaced with SL multicast communication, SL one-to-many communication, and so on.

In-device coexistence of LTE SL and NR SL will be described below.

Figure 16:
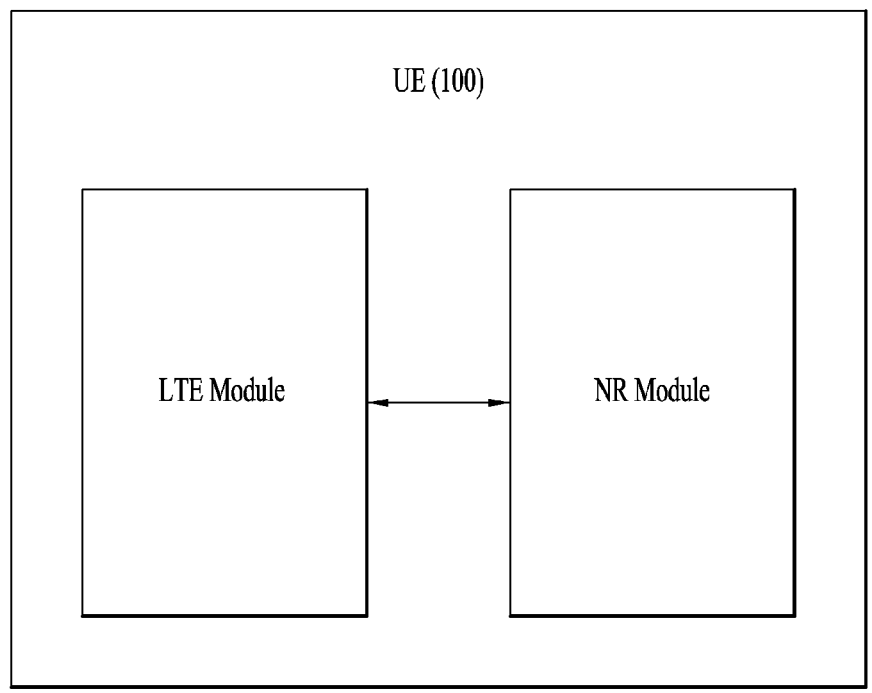
FIG. 16 is a block diagram illustrating a UE including an LTE module and an NR module according to an embodiment of the present disclosure.

FIG. 16 illustrates a UE including an LTE module and an NR module according to an embodiment of the present disclosure.

Referring to FIG. 16, the UE may include a module related to LTE SL transmission and a module related to NR SL transmission. A packet related to LTE SL transmission generated in a higher layer may be delivered to the LTE module. A packet related to NR SL transmission generated in a higher layer may be delivered to the NR module. For example, the LTE module and the NR module may be related to a common higher layer (e.g., application layer). Alternatively, for example, the LTE module and the NR module may be related to different higher layers (e.g., a higher layer related to the LTE module and a higher layer related to the NR module). Each packet may be related to a specific priority. In this case, the LTE module may have no knowledge of the priority of a packet related to NR SL transmission, and the NR module may have no knowledge of the priority of a packet related to LTE SL transmission. For comparison between the priorities, the priority of the packet related to LTE SL transmission and the priority of the packet related to NR SL transmission may be exchanged between the LTE module and the NR module. Accordingly, the LTE module and the NR module may know the priority of the packet related to LTE SL transmission and the priority of the packet related to NR SL transmission. When the LTE SL transmission and the NR SL transmission overlap with each other, the UE may compare the priority of the packet related to the LTE SL transmission with the priority of the packet related to the NR SL transmission, and thus perform only the SL transmission with the higher priority. For example, an NR V2X priority field and a ProSe per-packet priority (PPPP) may be directly compared with each other.

For example, [Table 5] illustrates an example of the priorities of services related to LTE SL transmission and the priorities of services related to NR SL transmission. For the convenience of description, a description will be given of PPPPs, but the priorities are not limited to PPPPs. For example, priorities may be defined in various manners. For example, the same type of common priorities may be applied to NR-related services and LTE-related services.

TABLE 5

| LTE-related service | PPPP value | NR-related service | PPPP value |
|---|---|---|---|
| LTE SL service A | 1 | NR SL service D | 1 |
| LTE SL service B | 2 | NR SL service E | 2 |
| LTE SL service C | 3 | NR SL service F | 3 |

For example, in the embodiment of Table 5, it is assumed that the UE determines to transmit LTE SL service A and NR SL service E, and a transmission for LTE SL service A and a transmission for NR SL service E overlap with each other. For example, the transmission for LTE SL service A and the transmission for NR SL service E may overlap fully or partially in the time domain. In this case, the UE may perform only the SL transmission with the higher priority, skipping the SL transmission with the lower priority. For example, the UE may transmit only LTE SL service A on a first carrier and/or a first channel. On the other hand, the UE may not transmit NR SL service E on a second carrier and/or a second channel.

Now, a description will be given of a CAM and a DENM will be described.

In V2V communication, a CAM of a periodic message type and a DENM of an event-triggered message type may be transmitted. The CAM may include basic vehicle information, such as dynamic state information about a vehicle like a direction and a speed, vehicle static data like dimensions, exterior lighting conditions, route details, and so on. The CAM may be 50 to 300 bytes long. The CAM is broadcast and has a latency requirement below 100 ms. The DENM may be a message generated in a sudden situation such as a vehicle breakdown or accident. The DENM may be shorter than 3000 bytes, and receivable at any vehicle within a transmission range. The DENM may have a higher priority than the CAM.

Carrier reselection will be described below.

In V2X or SL communication, the UE may perform carrier reselection based on the channel busy ratios (CBRs) of configured carriers and/or the PPPP of a V2X message to be transmitted. For example, carrier reselection may be performed in the MAC layer of the UE. In various embodiments of the present disclosure, PPPP and ProSe per packet reliability (PPPR) may be interchangeably used with each other. For example, as a PPPP value is smaller, this may mean a higher priority, and as the PPPP value is larger, this may mean a lower priority. For example, as a PPPR value is smaller, this may mean higher reliability, and as the PPPR value is larger, this may mean lower reliability. For example, a PPPP value related to a service, packet or message with a higher priority may be less than a PPPP value related to a service, packet or message with a lower priority. For example, a PPPR value related to a service, packet or message with higher reliability may be less than a PPPR value related to a service, packet or message with lower reliability.

A CBR may refer to the fraction of sub-channels in a resource pool, of which the sidelink-received signal strength indicator (S-RSSI) measured by the UE is sensed as exceeding a predetermined threshold. There may be a PPPP related to each logical channel, and the configuration of the PPPP value should reflect latency requirements of both the UE and the BS. During carrier reselection, the UE may select one or more of candidate carriers in an ascending order from the lowest CBR.

Now, RRC connection establishment between UEs will be described.

For V2X or SL communication, a transmitting UE may need to establish a (PC5) RRC connection with a receiving UE. For example, a UE may obtain a V2X-specific SIB. For a UE with data to be transmitted, which is configured with V2X or SL transmission by a higher layer, when at least a frequency configured for transmission of the UE for SL communication is included in the V2X-specific SIB, the UE may establish an RRC connection with another UE without including a transmission resource pool for the frequency. For example, once the RRC connection is established between the transmitting UE and the receiving UE, the transmitting UE may perform unicast communication with the receiving UE via the established RRC connection.

When the RRC connection is established between the UEs, the transmitting UE may transmit an RRC message to the receiving UE.

Figure 17:
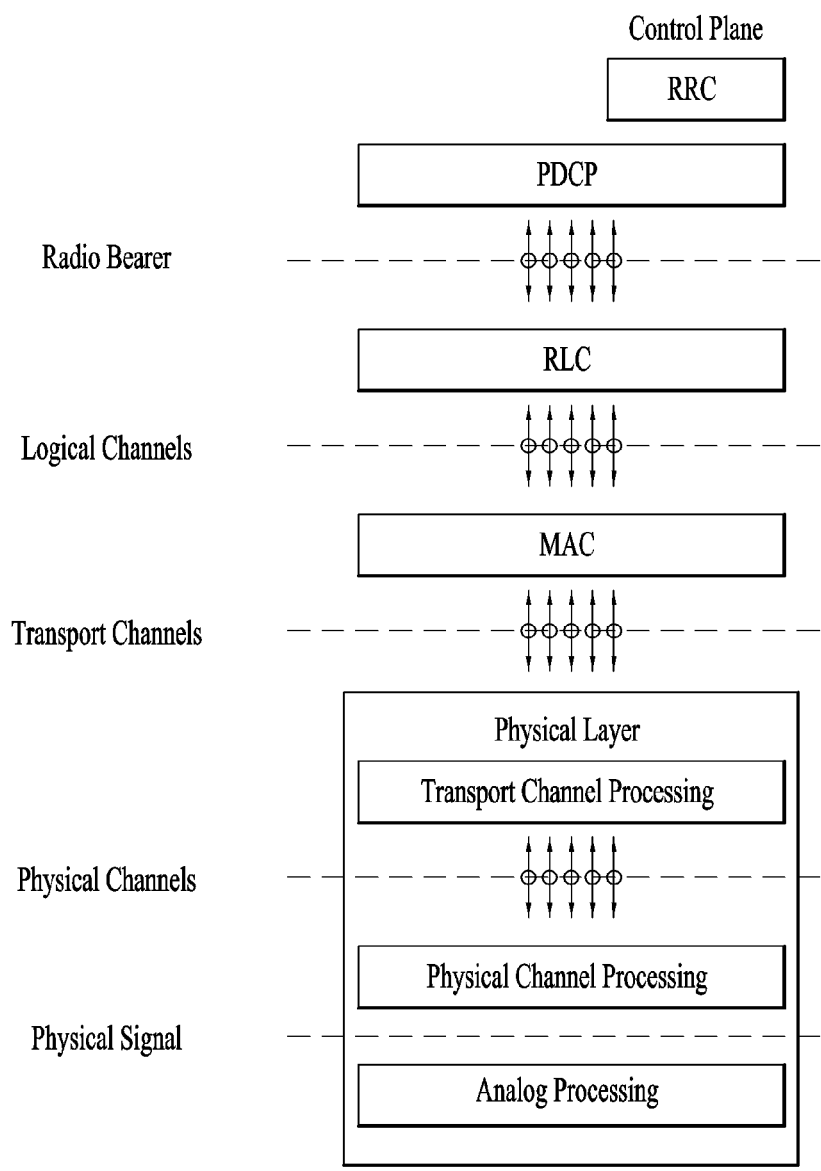
FIG. 17 is a diagram illustrating a procedure of transmitting a radio resource control (RRC) message according to an embodiment of the present disclosure.

FIG. 17 illustrates a procedure of transmitting an RRC message according to an embodiment of the present disclosure.

Referring to FIG. 17, an RRC message generated by a transmitting UE may be delivered to the PHY layer via the PDCP layer, the RLC layer, and the MAC layer. The RRC message may be transmitted through a signaling radio bearer (SRB). The PHY layer of the transmitting UE may subject the received information to encoding, modulation, and antenna/resource mapping, and the transmitting UE may transmit the information to a receiving UE.

The receiving UE may subject the received information to antenna/resource demapping, demodulation, and decoding. The information may be delivered to the RRC layer via the MAC layer, the RLC layer, and the PDCP layer. Therefore, the receiving UE may receive the RRC message generated by the transmitting UE.

V2X or SL communication may be supported for a UE in RRC_CONNECTED mode, a UE in RRC_IDLE mode, and a UE in (NR) RRC_INACTIVE mode. That is the UE in the RRC_CONNECTED mode, the UE in the RRC_IDLE mode and the UE in the (NR) RRC_INACTIVE mode may perform V2X or SL communication. The UE in the RRC_INACTIVE mode or the UE in the RRC_IDLE mode may perform V2X or SL communication by using a cell-specific configuration included in a V2X-specific SIB.

The RRC may be used to exchange at least a UE capability and an AS layer configuration. For example, UE1 may transmit its UE capability and AS layer configuration to UE2, and receive a UE capability and an AS layer configuration of UE2 from UE2. For UE capability delivery, an information flow may be triggered during or after PC5-S signaling for direct link setup.

Figure 18:
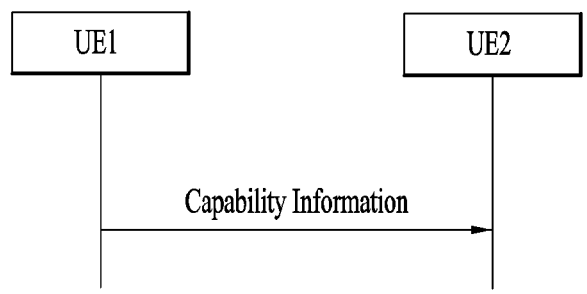
FIG. 18 is a diagram illustrating uni-directional delivery of UE capability information according to an embodiment of the present disclosure.

FIG. 18 illustrates uni-directional UE capability delivery according to an embodiment of the present disclosure.

Figure 19:
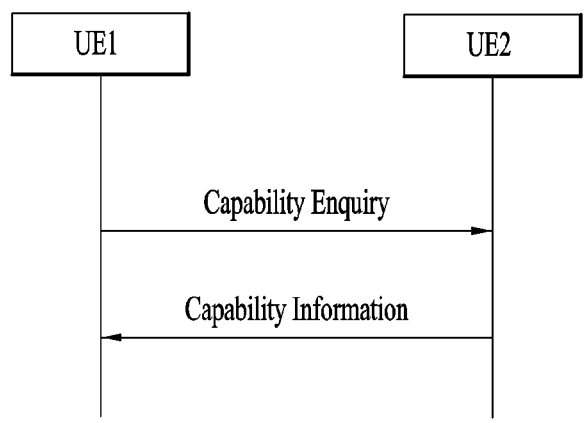
FIG. 19 is a diagram illustrating bi-directional delivery of UE capability information according to an embodiment of the present disclosure.

FIG. 19 illustrates bi-directional UE capability delivery according to an embodiment of the present disclosure.

For an AS layer configuration, an information flow may be triggered during or after PC5-S signaling for direct link setup.

Figure 20:
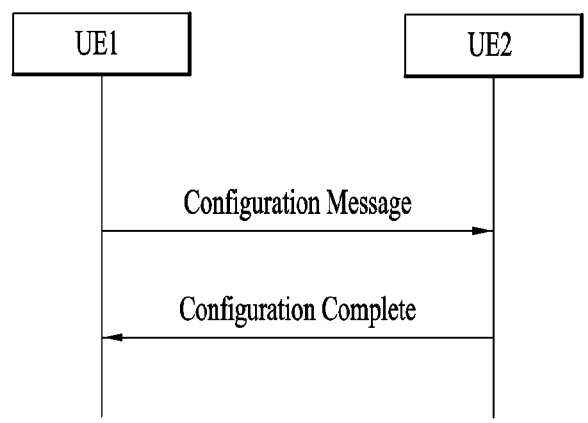
FIG. 20 is a diagram illustrating a bi-directional access stratum (AS) layer configuration according to an embodiment of the present disclosure.

FIG. 20 illustrates a bi-directional AS layer configuration according to an embodiment of the present disclosure.

In groupcast, one-to-many PC5-RRC connection establishment may not be needed between group members.

SL radio link monitoring (SLM) will be described below.

For unicast AS-level link management, SL RLM and/or radio link failure (RLF) declaration may be supported. In RLC acknowledged mode (SL AM) of SL unicast, the RLF declaration may be triggered by an indication from the RLC indicating that a maximum number of retransmissions has been reached. An AS-level link status (e.g., failure) may need to be known to a higher layer. Unlike the RLM procedure for unicast, a groupcast-related RLM design may not be considered. The RLM and/or RLF declaration may not be needed between group members for groupcast.

For example, the transmitting UE may transmit an RS to the receiving UE, and the receiving UE may perform SL RLM using the RS. For example, the receiving UE may declare an SL RLF using the RS. For example, the RS may be referred to as an SL RS.

SL measurement and reporting will be described below.

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. For unicast communication, a CQI, an RI and a PMI or a part of them may be supported in a non-subband-based aperiodic CSI report based on the assumption of four or fewer antenna ports. The CSI procedure may not depend on a standalone RS. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

PHY-layer processing will be described below.

According to an embodiment of the present disclosure, a data unit may be subjected to PHY-layer processing at a transmitting side before being transmitted over an air interface. According to an embodiment of the present disclosure, a radio signal carrying a data unit may be subjected to PHY-layer processing at a receiving side.

Figure 21:
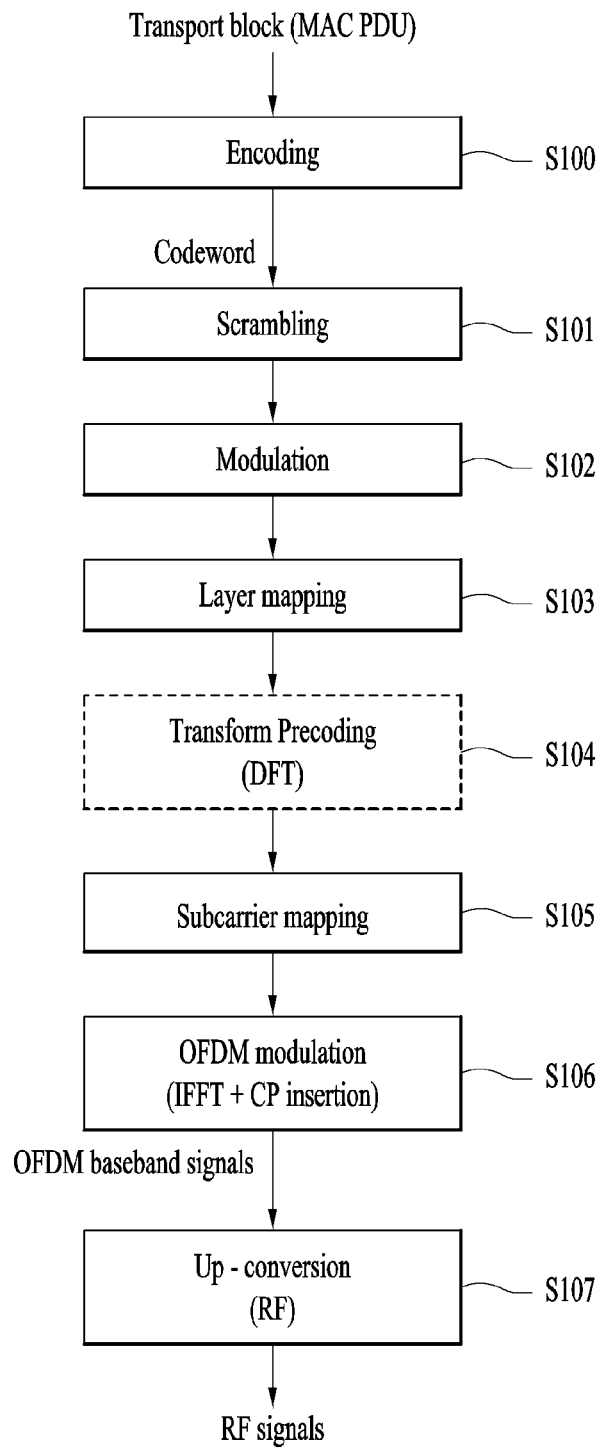
FIG. 21 is a diagram illustrating physical (PHY)-layer processing at a transmitting side according to an embodiment of the present disclosure.

FIG. 21 illustrates PHY-layer processing at a transmitting side according to an embodiment of the present disclosure.

[Table 6] may illustrate a mapping relationship between UL transport channels and physical channels, and [Table 7] may illustrate a mapping relationship between UL control channel information and physical channels.

TABLE 6

| Transport channel | Physical channel |
| --- | --- |
| UL-SCH (UL-Shared Channel) | PUSCH (Physical UL Shared Channel) |
| RACH (Random Access Channel) | PRACH (Physical Random Access Channel) |

TABLE 7

| Control information | Physical channel |
| --- | --- |
| UCI (UL Control Information) | PUCCH (Physical UL Control Channel) PUSCH (Physical UL Shared Channel) |

[Table 8] may illustrate a mapping relationship between DL transport channels and physical channels, and Table 9 may illustrate a mapping relationship between DL control channel information and physical channels.

TABLE 8

| Transport channel | Physical channel |
| --- | --- |
| DL-SCH (DL-Shared Channel) | PDSCH (Physical DL Shared Channel) |
| BCH (Broadcast Channel) | PBCH (Physical Broadcast Channel) |
| PCH (Paging Channel) | PDSCH (Physical DL Shared Channel) |

TABLE 9

| Control information | Physical channel |
| --- | --- |
| DCI (DL Control Information) | PDCCH (Physical DL Control Channel) |

[Table 10] may illustrate a mapping relationship between SL transport channels and physical channels, and [Table 11] may illustrate a mapping relationship between SL control channel information and physical channels.

TABLE 10

| Transport channel | Physical channel |
| --- | --- |
| SL-SCH (Sidelink-Shared Channel) | PSSCH (Physical Sidelink Shared Channel) |
| SL-BCH (Sidelink-Broadcast Channel) | PSBCH (Physical Sidelink Broadcast Channel) |

TABLE 11

| Control information | Physical Channel |
| --- | --- |
| 1st-stage SCI | PSCCH |
| 2nd-stage SCI | PSSCH |
| SFCI | PSFCH |

Referring to FIG. 21, a transmitting side may encode a TB in step S100. The PHY layer may encode data and a control stream from the MAC layer to provide transport and control services via a radio transmission link in the PHY layer. For example, a TB from the MAC layer may be encoded to a codeword at the transmitting side. A channel coding scheme may be a combination of error detection, error correction, rate matching, interleaving, and control information or a transport channel demapped from a physical channel. Alternatively, a channel coding scheme may be a combination of error detection, error correcting, rate matching, interleaving, and control information or a transport channel mapped to a physical channel.

In the NR system, the following channel coding schemes may be used for different types of transport channels and different types of control information. For example, channel coding schemes for respective transport channel types may be listed as in [Table 12]. For example, channel coding schemes for respective control information types may be listed as in [Table 13].

TABLE 12

| Transport channel | Channel coding scheme |
|---|---|
| UL-SCH | LDPC(Low Density Parity Check) |
| DL-SCH | |
| SL-SCH | |
| PCH | |
| BCH | Polar code |
| SL-BCH | |

TABLE 13

| Control information | Channel coding scheme |
|---|---|
| DCI | Polar code |
| SCI | |
| UCI | Block code, Polar code |

For example, a polar coae may ne appiiea to tne ror example, an LDPC code may be applied to a TB transmitted on the PSSCH.

For transmission of a TB (e.g., a MAC PDU), the transmitting side may attach a CRC sequence to the TB. Thus, the transmitting side may provide error detection for the receiving side. In SL communication, the transmitting side may be a transmitting UE, and the receiving side may be a receiving UE. In the NR system, a communication device may use an LDPC code to encode/decode a UL-SCH and a DL-SCH. The NR system may support two LDPC base graphs (i.e., two LDPC base metrics). The two LDPC base graphs may be LDPC base graph 1 optimized for a small TB and LDPC base graph 2 optimized for a large TB. The transmitting side may select LDPC base graph 1 or LDPC base graph 2 based on the size and coding rate R of a TB. The coding rate may be indicated by an MCS index, I_MCS. The MCS index may be dynamically provided to the UE by a PDCCH that schedules a PUSCH or PDSCH. Alternatively, the MCS index may be dynamically provided to the UE by a PDCCH that (re)initializes or activates UL configured grant type 2 or DL semi-persistent scheduling (SPS). The MCS index may be provided to the UE by RRC signaling related to UL configured grant type 1. When the TB attached with the CRC is larger than a maximum code block (CB) size for the selected LDPC base graph, the transmitting side may divide the TB attached with the CRC into a plurality of CBs. The transmitting side may further attach an additional CRC sequence to each CB. The maximum code block sizes for LDPC base graph 1 and LDPC base graph 2 may be 8448 bits and 3480 bits, respectively. When the TB attached with the CRC is not larger than the maximum CB size for the selected LDPC base graph, the transmitting side may encode the TB attached with the CRC to the selected LDPC base graph. The transmitting side may encode each CB of the TB to the selected LDPC basic graph. The LDPC CBs may be rate-matched individually. The CBs may be concatenated to generate a codeword for transmission on a PDSCH or a PUSCH. Up to two codewords (i.e., up to two TBs) may be transmitted simultaneously on the PDSCH. The PUSCH may be used for transmission of UL-SCH data and layer-1 and/or layer-2 control information. While not shown in FIG. 21, layer-1 and/or layer-2 control information may be multiplexed with a codeword for UL-SCH data.

In steps S101 and S102, the transmitting side may scramble and modulate the codeword. The bits of the codeword may be scrambled and modulated to produce a block of complex-valued modulation symbols.

In step S103, the transmitting side may perform layer mapping. The complex-valued modulation symbols of the codeword may be mapped to one or more MIMO layers. The codeword may be mapped to up to four layers. The PDSCH may carry two codewords, thus supporting up to 8-layer transmission. The PUSCH may support a single codeword, thus supporting up to 4-layer transmission.

In step S104, the transmitting side may perform precoding transform. A DL transmission waveform may be general OFDM using a CP. For DL, transform precoding (i.e., discrete Fourier transform (DFT)) may not be applied.

A UL transmission waveform may be conventional OFDM using a CP having a transform precoding function that performs DFT spreading which may be disabled or enabled. In the NR system, transform precoding, if enabled, may be selectively applied to UL. Transform precoding may be to spread UL data in a special way to reduce the PAPR of the waveform. Transform precoding may be a kind of DFT. That is the NR system may support two options for the UL waveform. One of the two options may be CP-OFDM (same as DL waveform) and the other may be DFT-s-OFDM. Whether the UE should use CP-OFDM or DFT-s-OFDM may be determined by the BS through an RRC parameter.

In step S105, the transmitting side may perform subcarrier mapping. A layer may be mapped to an antenna port. In DL, transparent (non-codebook-based) mapping may be supported for layer-to-antenna port mapping, and how beamforming or MIMO precoding is performed may be transparent to the UE. In UL, both non-codebook-based mapping and codebook-based mapping may be supported for layer-to-antenna port mapping.

For each antenna port (i.e. layer) used for transmission of a physical channel (e.g. PDSCH, PUSCH, or PSSCH), the transmitting side may map complex-valued modulation symbols to subcarriers in an RB allocated to the physical channel.

In step S106, the transmitting side may perform OFDM modulation. A communication device of the transmitting side may add a CP and perform inverse fast Fourier transform (IFFT), thereby generating a time-continuous OFDM baseband signal on an antenna port p and a subcarrier spacing (SPS) configuration u for an OFDM symbol 1 within a TTI for the physical channel. For example, for each OFDM symbol, the communication device of the transmitting side may perform IFFT on a complex-valued modulation symbol mapped to an RB of the corresponding OFDM symbol. The communication device of the transmitting side may add a CP to the IFFT signal to generate an OFDM baseband signal.

In step S107, the transmitting side may perform up-conversion. The communication device of the transmitting side may upconvert the OFDM baseband signal, the SCS configuration u, and the OFDM symbol 1 for the antenna port p to a carrier frequency f0 of a cell to which the physical channel is allocated.

Figure 40:
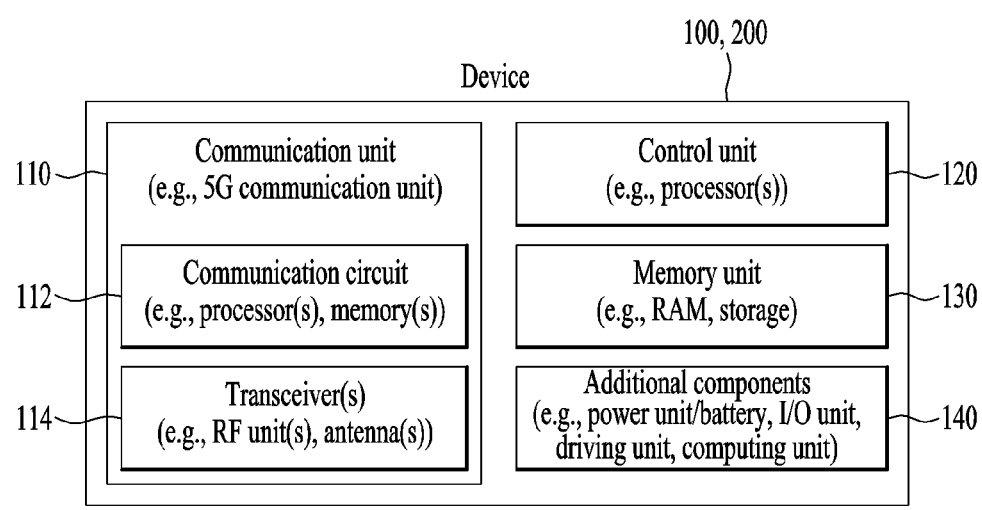
Figure 41:
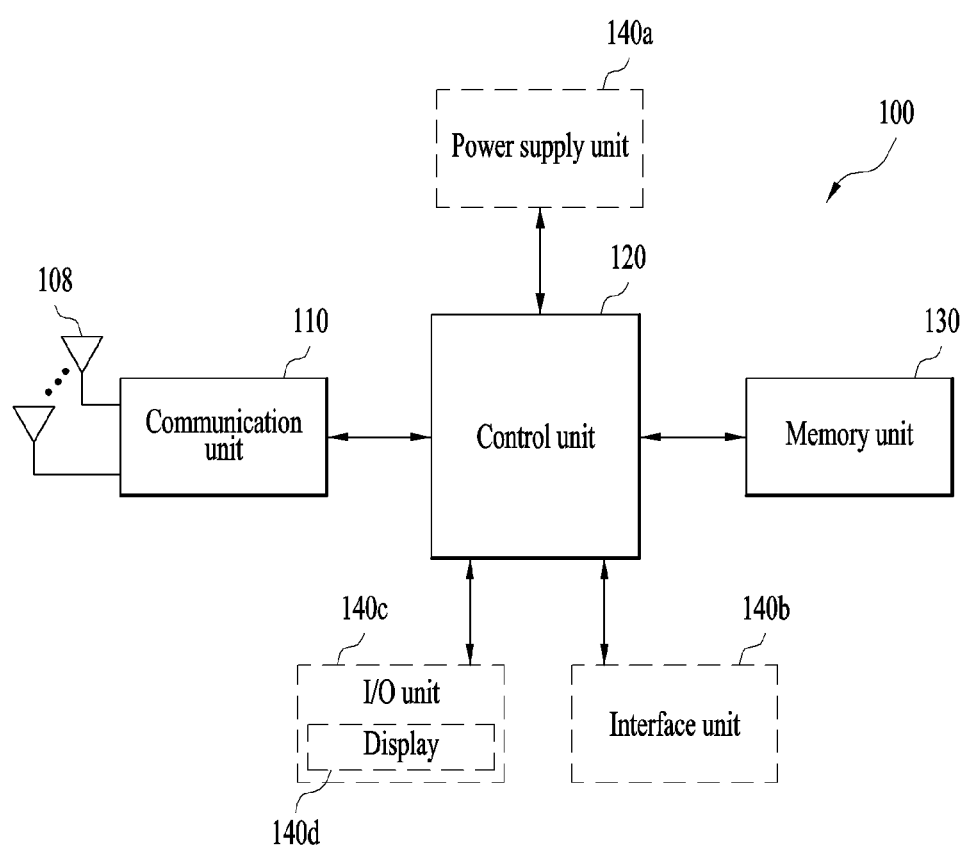
Figure 42:
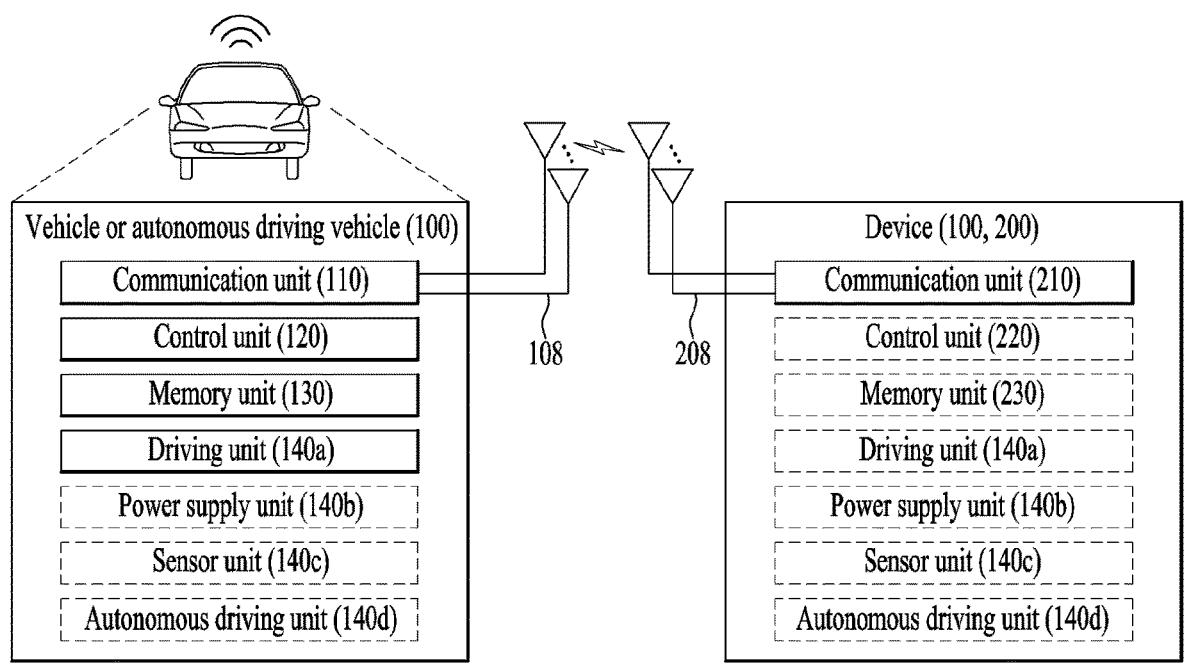
Figure 43:
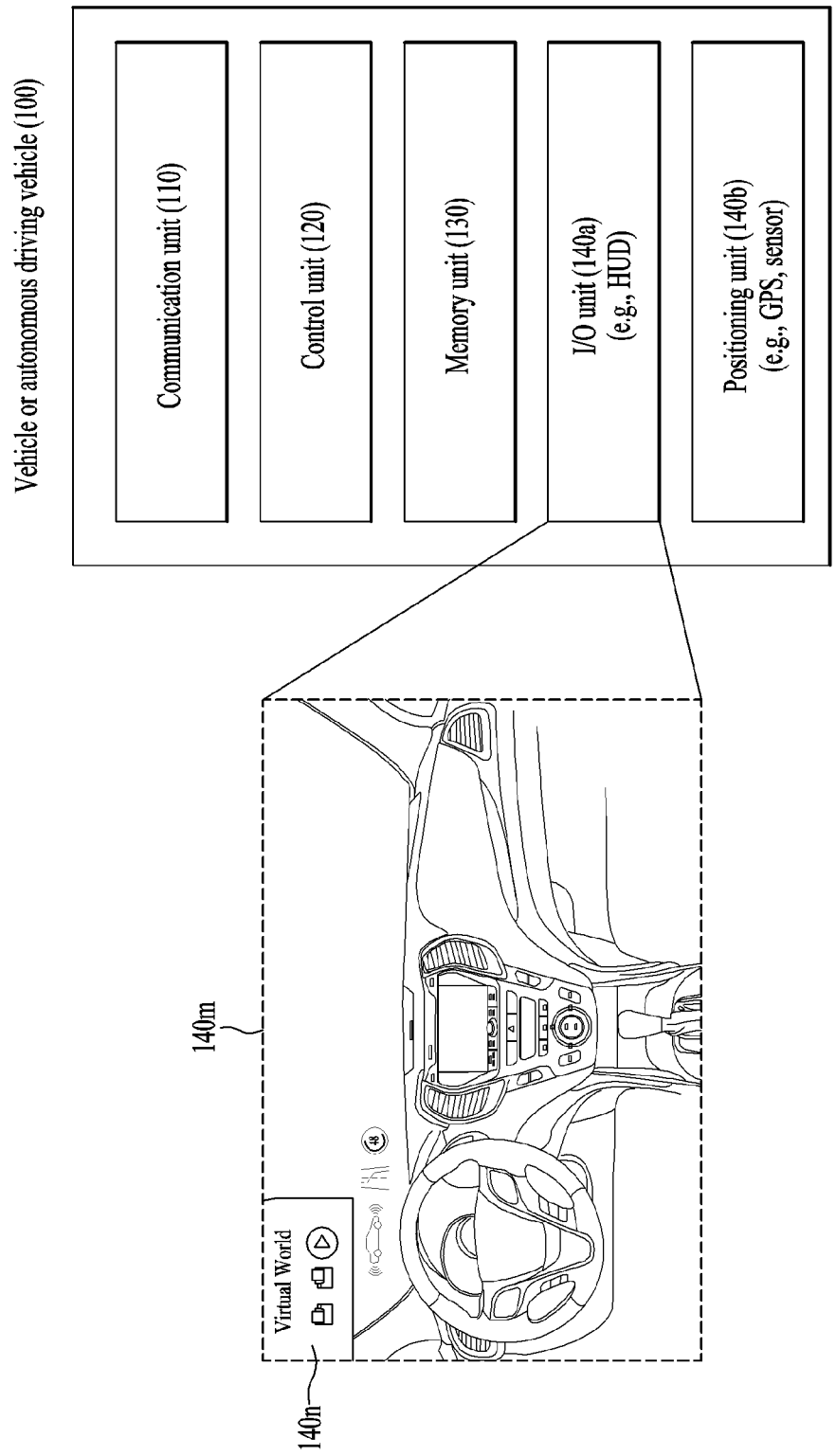
Figure 44:
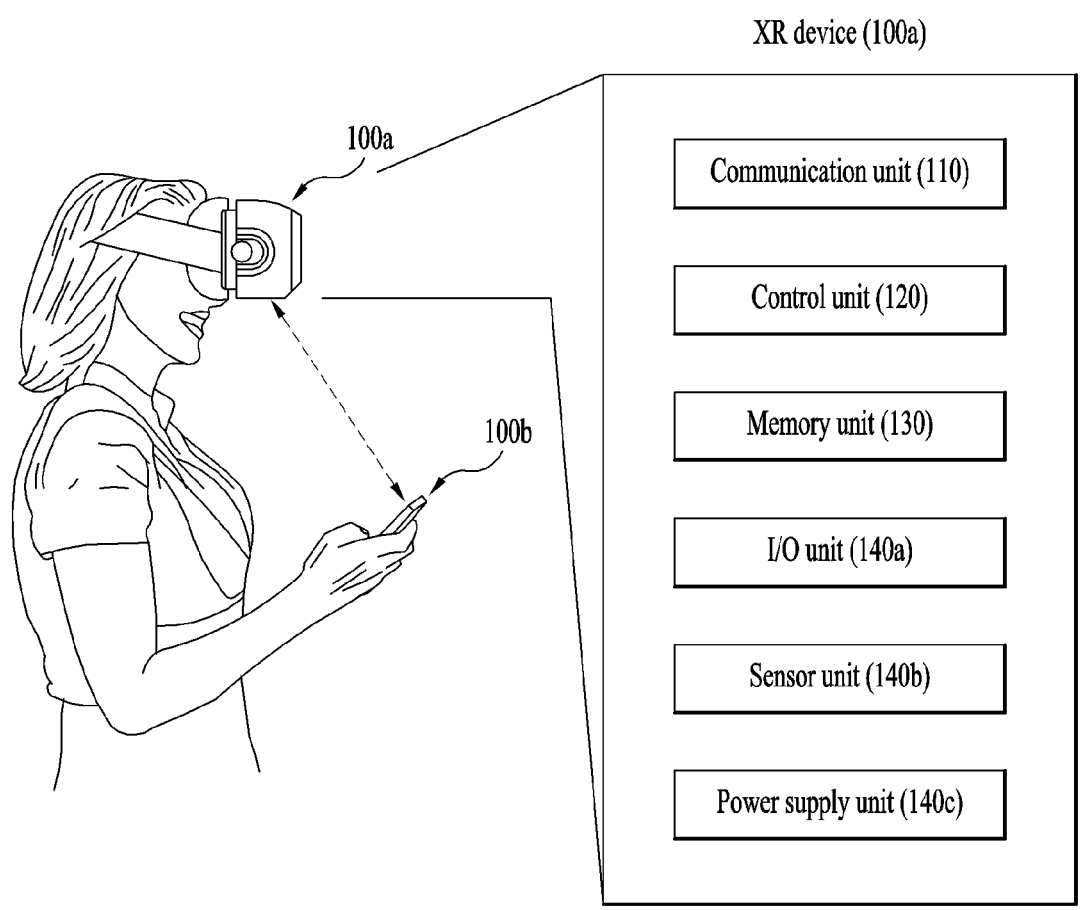

Processors 102 and 202 of FIG. 40 may be configured to perform encoding, scrambling, modulation, layer mapping, precoding transformation (for UL), subcarrier mapping, and OFDM modulation.

Figure 22:
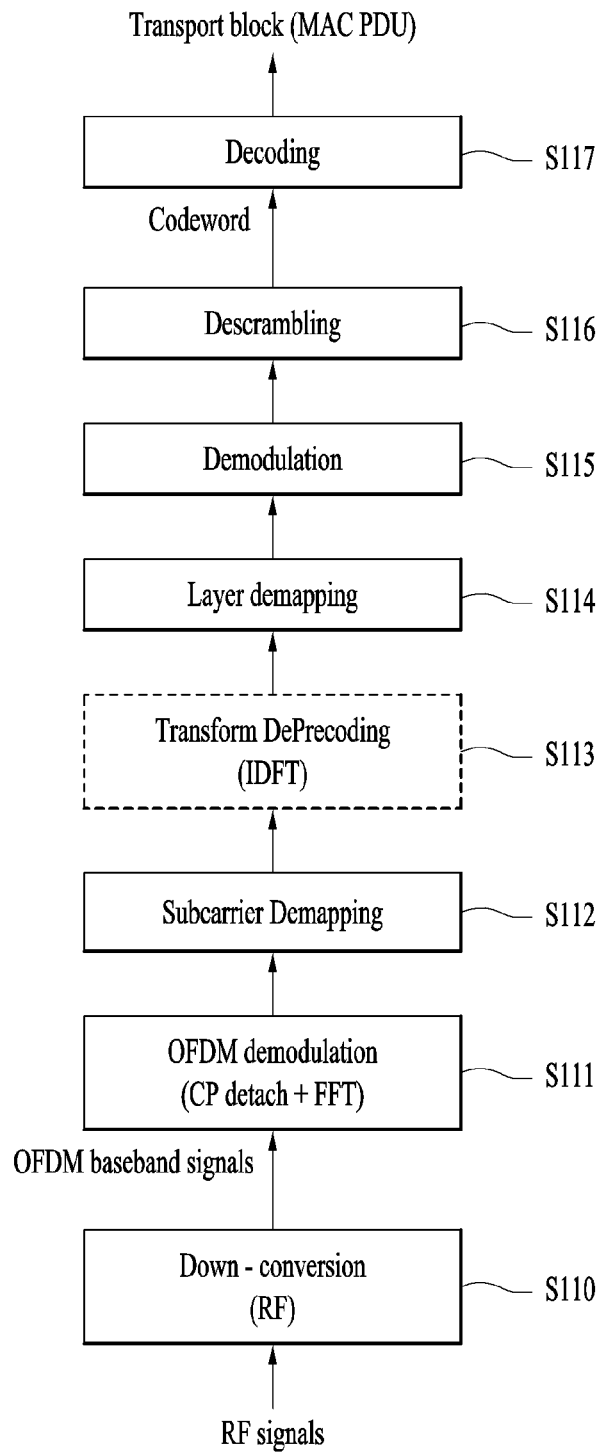
FIG. 22 is a diagram illustrating PHY-layer processing at a receiving side according to an embodiment of the present disclosure.

FIG. 22 illustrates PHY-layer processing at a receiving side according to an embodiment of the present disclosure.

The PHY-layer processing of the receiving side may be basically the reverse processing of the PHY-layer processing of a transmitting side.

In step S110, the receiving side may perform frequency downconversion. A communication device of the receiving side may receive a radio frequency (RF) signal in a carrier frequency through an antenna. A transceiver 106 or 206 that receives the RF signal in the carrier frequency may downconvert the carrier frequency of the RF signal to a baseband to obtain an OFDM baseband signal.

In step S111, the receiving side may perform OFDM demodulation. The communication device of the receiving side may acquire complex-valued modulation symbols by CP detachment and fast Fourier transform (FFT). For example, for each OFDM symbol, the communication device of the receiving side may remove a CP from the OFDM baseband signal. The communication device of the receiving side may then perform FFT on the CP-free OFDM baseband signal to obtain complex-valued modulation symbols for an antenna port p, an SCS u, and an OFDM symbol 1.

In step S112, the receiving side may perform subcarrier demapping. Subcarrier demapping may be performed on the complex-valued modulation symbols to obtain complex-valued modulation symbols of the physical channel. For example, the processor of a UE may obtain complex-valued modulation symbols mapped to subcarriers of a PDSCH among complex-valued modulation symbols received in a BWP.

In step S113, the receiving side may perform transform de-precoding. When transform precoding is enabled for a UL physical channel, transform de-precoding (e.g., inverse discrete Fourier transform (IDFT)) may be performed on complex-valued modulation symbols of the UL physical channel. Transform de-precoding may not be performed for a DL physical channel and a UL physical channel for which transform precoding is disabled.

In step S114, the receiving side may perform layer demapping. The complex-valued modulation symbols may be demapped into one or two codewords.

In steps S115 and S116, the receiving side may perform demodulation and descrambling. The complex-valued modulation symbols of the codewords may be demodulated and descrambled into bits of the codewords.

In step S117, the receiving side may perform decoding. The codewords may be decoded into TBs. For a UL-SCH and a DL-SCH, LDPC base graph 1 or LDPC base graph 2 may be selected based on the size and coding rate R of a TB. A codeword may include one or more CBs. Each coded block may be decoded into a CB to which a CRC has been attached or a TB to which a CRC has been attached, by the selected LDPC base graph. When CB segmentation has been performed for the TB attached with the CRC at the transmitting side, a CRC sequence may be removed from each of the CBs each attached with a CRC, thus obtaining CBs. The CBs may be concatenated to a TB attached with a CRC. A TB CRC sequence may be removed from the TB attached with the CRC, thereby obtaining the TB. The TB may be delivered to the MAC layer.

Each of processors 102 and 202 of FIG. 40 may be configured to perform OFDM demodulation, subcarrier demapping, layer demapping, demodulation, descrambling, and decoding.

In the above-described PHY-layer processing on the transmitting/receiving side, time and frequency resources (e.g., OFDM symbol, subcarrier, and carrier frequency) related to subcarrier mapping, OFDM modulation, and frequency upconversion/downconversion may be determined based on a resource allocation (e.g., an UL grant or a DL assignment).

Now, an HARQ procedure will be described.

An error compensation technique for ensuring communication reliability may include a forward error correction (FEC) scheme and an automatic repeat request (ARQ) scheme. In the FEC scheme, an error in a receiver may be corrected by adding an extra error correction code to information bits. Although the FEC scheme offers the benefits of a short time delay and no need for separately exchanging information between a transmitter and a receiver, the FEC scheme has decreased system efficiency in a good channel environment. The ARQ scheme may improve the transmission reliability. Despite the advantage, the ARQ scheme incurs a time delay and has decreased system efficiency in a poor channel environment.

HARQ is a combination of FEC and ARQ. In HARQ, it is determined whether data received in the PHY layer includes an error that is not decodable, and upon generation of an error, a retransmission is requested to thereby improve performance.

In SL unicast and groupcast, HARQ feedback and HARQ combining in the PHY layer may be supported. For example, when the receiving UE operates in resource allocation mode 1 or 2, the receiving UE may receive a PSSCH from the transmitting UE, and transmit an HARQ feedback for the PSSCH in a sidelink feedback control information (SFCI) format on a physical sidelink feedback channel (PSFCH).

For example, SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

For example, when SL HARQ feedback is enabled for groupcast, the receiving UE may determine whether to transmit an HARQ feedback to the transmitting UE based on a transmission-reception (TX-RX) distance and/or an RSRP.

For example, in the case of TX-RX distance-based HARQ feedback in groupcast option 1, when the TX-RX distance is less than or equal to a communication range requirement, the receiving UE may transmit an HARQ feedback for the PSSCH to the transmitting UE. On the other hand, when the TX-RX distance is larger than the communication range requirement, the receiving UE may not transmit the HARQ feedback for the PSSCH to the transmitting UE. For example, the transmitting UE may inform the receiving UE of the location of the transmitting UE by SCI related to the PSSCH. For example, the SCI related to the PSSCH may be second SCI. For example, the receiving UE may estimate or obtain the TX-RX distance based on the locations of the receiving UE and the transmitting UE. For example, the receiving UE may decode the SCI related to the PSSCH, so as to know the communication range requirement used for the PSSCH.

For example, in resource allocation mode 1, a time between the PSFCH and the PSSCH may be configured or preconfigured. In unicast and groupcast, when a retransmission is needed on SL, this may be indicated to the BS by an in-coverage UE using a PUCCH. The transmitting UE may transmit an indication to its serving BS in the form of a scheduling request (SR)/buffer status report (BSR) instead of an HARQ ACK/NACK. Further, even though the BS fails to receive the indication, the BS may schedule SL retransmission resources for the UE. For example, in resource allocation mode 2, the time between the PSFCH and the PSSCH may be configured or preconfigured.

For example, from the viewpoint of transmission of a UE on a carrier, time division multiplexing (TDM) between a PSCCH/PSSCH and a PSFCH may be allowed for a PSFCH format for the SL in a slot. For example, a sequence-based PSFCH format with one symbol may be supported. The one symbol may not be an AGC period. For example, the sequence-based PSFCH format may be applied to unicast and groupcast.

For example, PSFCH resources may be preconfigured or periodically configured to span N slot periods in slots related to a resource pool. For example, N may be set to one or more values equal to or larger than 1. For example, N may be 1, 2 or 4. For example, an HARQ feedback for a transmission in a specific resource pool may be transmitted only on a PSFCH in the specific resource pool.

For example, when the transmitting UE transmits the PSSCH in slot #X to slot #N to the receiving UE, the receiving UE may transmit an HARQ feedback for the PSSCH in slot #(N+A) to the transmitting UE. For example, slot #(N+A) may include PSFCH resources. For example, A may be a smallest integer greater than or equal to K. For example, K may be the number of logical slots. In this case, K may be the number of slots in the resource pool. Alternatively, for example, K may be the number of physical slots. In this case, K may be the number of slots inside and outside the resource pool.

For example, when the receiving UE transmits an HARQ feedback in PSFCH resources in response to one PSSCH transmitted by the transmitting UE, the receiving UE may determine the frequency area and/or code area of the PSFCH resources based on an implicit mechanism in the configured resource pool. For example, the receiving UE may determine the frequency area and/or code area of the PSFCH resources based on at least one of a slot index related to the PSCCH/PSSCH/PSFCH, a subchannel related to the PSCCH/PSSCH, or an ID identifying each receiving UE in a group for HARQ feedback based on groupcast option 2. Additionally or alternatively, for example, the receiving UE may determine the frequency area and/or code area of the PSFCH resources based on at least one of an SL RSRP, a signal-to-interference and noise ratio (SINR), an L1 source ID, or location information.

For example, when an HARQ feedback transmission of the UE on the PSFCH overlaps with an HARQ feedback reception of the UE on the PSFCH, the UE may select either the HARQ feedback transmission on the PSFCH or the HARQ feedback reception on the PSFCH based on a priority rule. For example, the priority rule may be based on a minimum priority indication of the related PSCCH/PSSCH.

For example, when HARQ feedback transmissions of the UE for a plurality of UEs overlap with each other on the PSFCH, the UE may select a specific HARQ feedback transmission based on the priority rule. For example, the priority rule may be based on the minimum priority indication of the related PSCCH/PSSCH.

Now, a description will be given of positioning.

Figure 23:
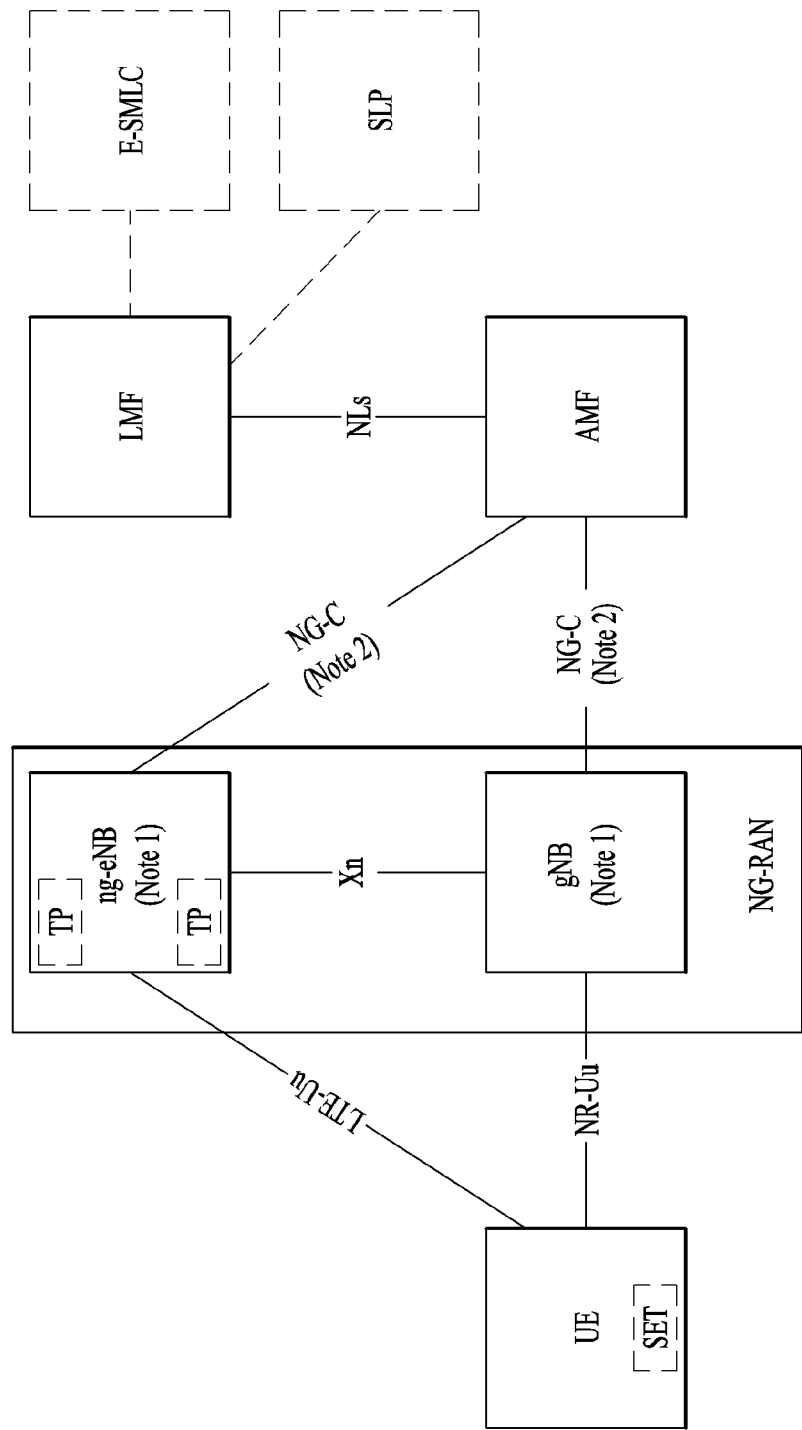
FIG. 23 is a diagram illustrating an exemplary architecture in a 5G system, for positioning a UE which has accessed an NG-RAN or an evolved UMTS terrestrial radio access network (E-UTRAN) according to an embodiment of the present disclosure.

FIG. 23 illustrates an exemplary architecture of a 5G system capable of positioning a UE connected to an NG-RAN or an E-UTRAN according to an embodiment of the present disclosure.

Referring to FIG. 23, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Figure 24:
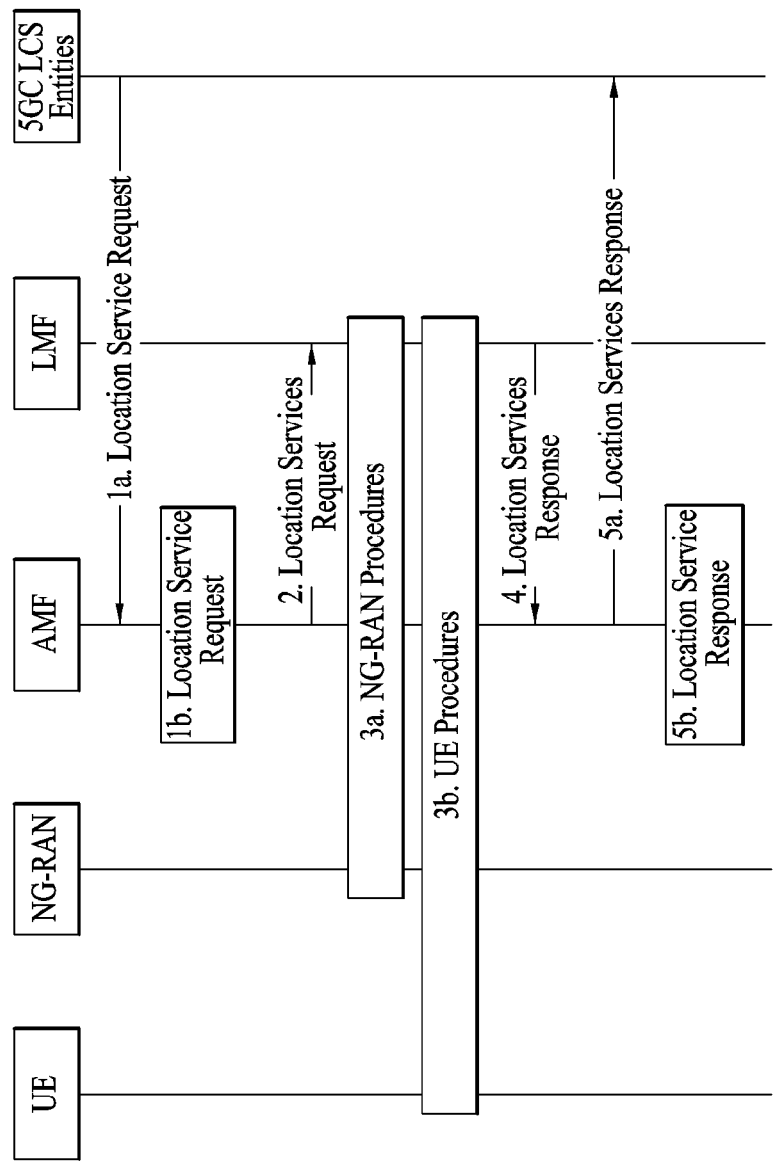
FIG. 24 is a diagram illustrating an implementation example of a network for positioning a UE according to an embodiment of the present disclosure.

FIG. 24 illustrates exemplary implementation of a network for positioning a UE according to an embodiment of the present disclosure.

Upon receipt of a location service request when the UE is in a connection management-IDLE (CM-IDLE) state, the AMF may establish a signaling connection with the UE and request a network trigger service to assign a specific serving gNB or ng-eNB. This operation is not shown in FIG. 24. That is FIG. 24 may be based on the assumption that the UE is in connected mode. However, the signaling connection may be released by the NG-RAN due to signaling and data deactivation during positioning.

Referring to FIG. 24, a network operation for positioning a UE will be described in detail. In step 1a, a 5GC entity such as a GMLC may request a location service for positioning a target UE to a serving AMF. However, even though the GMLC does not request the location service, the serving AMF may determine that the location service for positioning the target UE is required in step 1b. For example, for positioning the UE for an emergency call, the serving AMF may determine to perform the location service directly.

The AMF may then transmit a location service request to an LMF in step 2, and the LMF may start location procedures with the serving-eNB and the serving gNB to obtain positioning data or positioning assistance data in step 3a. Additionally, the LMF may initiate a location procedure for DL positioning with the UE in step 3b. For example, the LMF may transmit positioning assistance data (assistance data defined in 3GPP TS 36.355) to the UE, or obtain a location estimate or location measurement. Although step 3b may be additionally performed after step 3a, step 3b may be performed instead of step 3a.

In step 4, the LMF may provide a location service response to the AMF. The location service response may include information indicating whether location estimation of the UE was successful and the location estimate of the UE. Then, when the procedure of FIG. 24 is initiated in step 1a, the AMF may deliver the location service response to the 5GC entity such as the GMLC. When the procedure of FIG. 24 is initiated in step 1b, the AMF may use the location service response to provide the location service related to an emergency call or the like.

Figure 25:
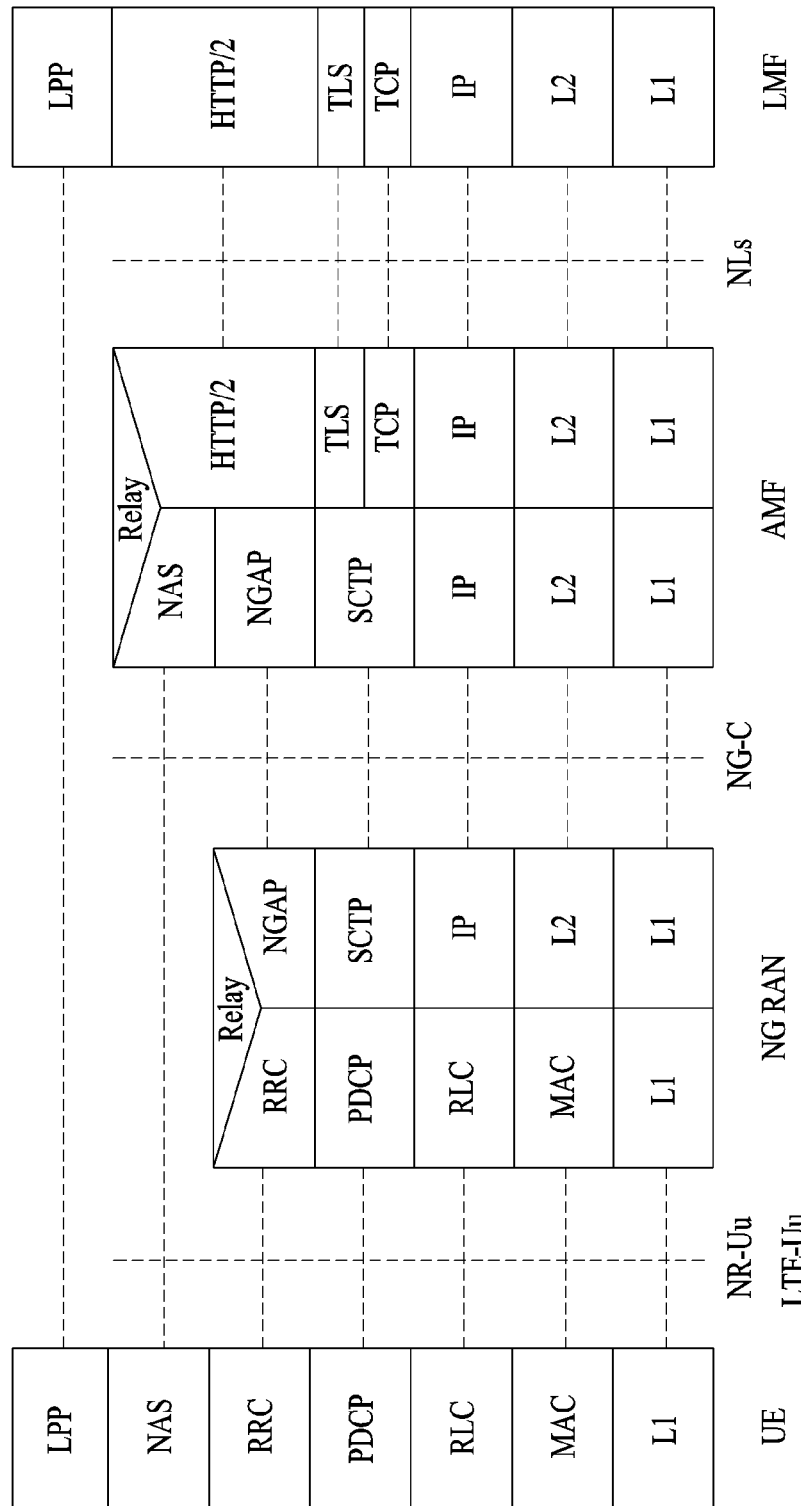
FIG. 25 is a diagram illustrating exemplary protocol layers used to support LTE positioning protocol (LPP) message transmission between a location management function (LMF) and a UE according to an embodiment of the present disclosure.

FIG. 25 illustrates exemplary protocol layers used to support LTE positioning protocol (LPP) message transmission between an LMF and a UE according to an embodiment of the present disclosure.

An LPP PDU may be transmitted in a NAS PDU between the AMF and the UE. Referring to FIG. 25, the LPP may be terminated between a target device (e.g., a UE in the control plane or a SUPL enabled terminal (SET) in the user plane) and a location server (e.g., an LMF in the control plane or an SLP in the user plane). An LPP message may be transmitted in a transparent PDU over an intermediate network interface by using an appropriate protocol such as the NG application protocol (NGAP) via an NG-control plane (NG-C) interface or a NAS/RRC via LTE-Uu and NR-Uu interfaces. The LPP allows positioning for NR and LTE in various positioning methods.

For example, the target device and the location server may exchange capability information with each other, positioning assistance data and/or location information over the LPP. Further, error information may be exchanged and/or discontinuation of an LPP procedure may be indicated, by an LPP message.

Figure 26:
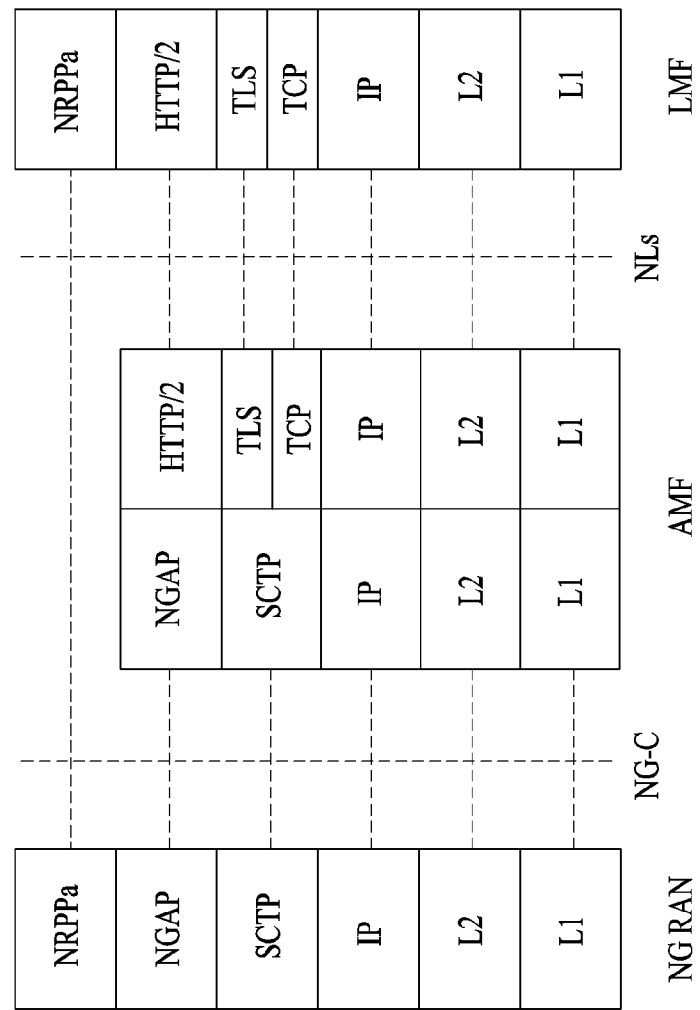
FIG. 26 is a diagram illustrating exemplary protocol layers used to support NR positioning protocol A (NRPPa) protocol data unit (PDU) transmission between an LMF and an NG-RAN node according to an embodiment of the present disclosure.

FIG. 26 illustrates exemplary protocol layers used to support NR positioning protocol A (NRPPa) PDU transmission between an LMF and an NG-RAN node according to an embodiment of the present disclosure.

NRPPa may be used for information exchange between the NG-RAN node and the LMF. Specifically, NRPPa enables exchange of an enhanced-cell ID (E-CID) for a measurement transmitted from the ng-eNB to the LMF, data to support OTDOA positioning, and a Cell-ID and Cell location ID for NR Cell ID positioning. Even without information about a related NRPPa transaction, the AMF may route NRPPa PDUs based on the routing ID of the related LMF via an NG-C interface.

Procedures of the NRPPa protocol for positioning and data collection may be divided into two types. One of the two types is a UE-associated procedure for delivering information (e.g., positioning information) about a specific UE, and the other type is a non-UE-associated procedure for delivering information (e.g., gNB/ng-eNB/TP timing information) applicable to an NG-RAN node and related TPs. The two types of procedures may be supported independently or simultaneously.

Positioning methods supported by the NG-RAN include GNSS, OTDOA, E-CID, barometric pressure sensor positioning, WLAN positioning, Bluetooth positioning, terrestrial beacon system (TBS), and UL time difference of arrival (UTDOA). Although a UE may be positioned in any of the above positioning methods, two or more positioning methods may be used to position the UE.

(1) Observed Time Difference Of Arrival (OTDOA)

Figure 27:
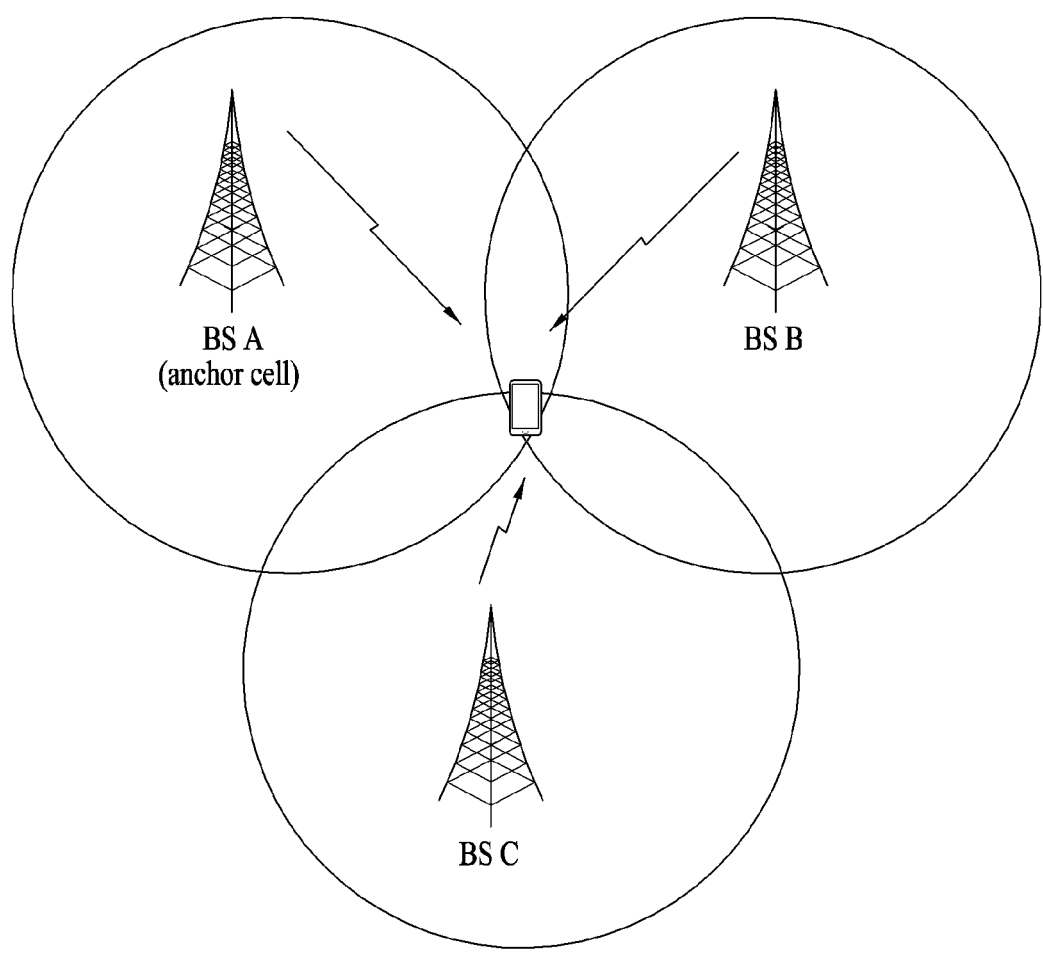
FIG. 27 is a diagram illustrating an observed time difference of arrival (OTDOA) positioning method according to an embodiment of the present disclosure.

FIG. 27 is a diagram illustrating an OTDOA positioning method according to an embodiment of the present disclosure.

In the OTDOA positioning method, a UE utilizes measurement timings of DL signals received from multiple TPs including an eNB, ng-eNB, and a PRS-dedicated TP. The UE measures the timings of the received DL signals using positioning assistance data received from a location server. The location of the UE may be determined based on the measurement results and the geographical coordinates of neighboring TPs.

A UE connected to a gNB may request a measurement gap for OTDOA measurement from a TP. When the UE fails to identify a single frequency network (SFN) for at least one TP in OTDOA assistance data, the UE may use an autonomous gap to acquire the SFN of an OTDOA reference cell before requesting a measurement gap in which a reference signal time difference (RSTD) is measured.

An RSTD may be defined based on a smallest relative time difference between the boundaries of two subframes received from a reference cell and a measurement cell. That is the RSTD may be calculated as a relative timing difference between a time when the UE receives the start of a subframe from the reference cell and a time when the UE receives the start of a subframe from the measurement cell which is closest to the subframe received from the reference cell. The reference cell may be selected by the UE.

For accurate OTDOA measurement, it is necessary to measure the time of arrivals (TOAs) of signals received from three or more geographically distributed TPs or BSs. For example, TOAs for TP 1, TP 2, and TP 3 may be measured, an RSTD for TP 1-TP 2, an RSTD for TP 2-TP 3, and an RSTD for TP 3-TP 1 may be calculated based on the three TOAs, geometric hyperbolas may be determined based on the calculated RSTDs, and a point where these hyperbolas intersect may be estimated as the location of the UE. Accuracy and/or uncertainty may be involved in each TOA measurement, and thus the estimated UE location may be known as a specific range according to the measurement uncertainty.

For example, an RSTD for two TPs may be calculated by Equation 1.

[Equation 1]

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$

where c is the speed of light, {xt, yt} is the (unknown) coordinates of the target UE, {xi, yi} is the coordinates of a (known) TP, and {x1, y1} is the coordinates of a reference TP (or another TP). (Ti−T1) is a transmission time offset between the two TPs, which may be referred to as "real time difference" (RTD), and ni and n1 may represent values related to UE TOA measurement errors.

(2) E-CID (Enhanced Cell ID)

In cell ID (CID) positioning, the location of a UE may be measured based on geographic information about the serving ng-eNB, serving gNB and/or serving cell of the UE. For example, the geographic information about the serving ng-eNB, the serving gNB, and/or the serving cell may be obtained by paging, registration, or the like.

For E-CID positioning, an additional UE measurement and/or NG-RAN radio resources may be used to improve a UE location estimate in addition to the CID positioning method. In the E-CID positioning method, although some of the same measurement methods as in the measurement control system of the RRC protocol may be used, an additional measurement is generally not performed only for positioning the UE. In other words, a separate measurement configuration or measurement control message may not be provided to position the UE, and the UE may also report a measured value obtained by generally available measurement methods, without expecting that an additional measurement operation only for positioning will be requested.

For example, the serving gNB may implement the E-CID positioning method using an E-UTRA measurement received from the UE.

Exemplary measurement elements that are available for E-CID positioning are given as follows.

UE measurements: E-UTRA RSRP, E-UTRA RSRQ, UE E-UTRA RX-TX time difference, GSM EDGE random access network (GERAN)/WLAN RSSI, UTRAN common pilot channel (CPICH) received signal code power (RSCP), and UTRAN CPICH Ec/Io.

E-UTRAN measurements: ng-eNB RX-TX time difference, timing advance (TADV), and angle of arrival (AoA).

TADVs may be classified into Type 1 and Type 2 as follows.

TADV Type 1=(ng-eNB RX-TX time difference)+(UE E-UTRA RX-TX time difference)

TADV Type 2=ng-eNB RX-TX time difference

On the other hand, an AoA may be used to measure the direction of the UE. The AoA may be defined as an estimated angle of the UE with respect to the location of the UE counterclockwise from a BS/TP. A geographical reference direction may be North. The BS/TP may use a UL signal such as a sounding reference signal (SRS) and/or a DMRS for AoA measurement. As the arrangement of antenna arrays is larger, the measurement accuracy of the AoA is higher. When the antenna arrays are arranged at the same interval, signals received at adjacent antenna elements may have a constant phase change (phase rotation).

(3) UTDOA (UL Time Difference of Arrival)

A UTDOA is a method of determining the location of a UE by estimating the arrival time of an SRS. When the estimated SRS arrival time is calculated, a serving cell may be used as a reference cell to estimate the location of the UE based on the difference in arrival time from another cell (or BS/TP). In order to implement the UTDOA method, an E-SMLC may indicate the serving cell of a target UE to indicate SRS transmission to the target UE. Further, the E-SMLC may provide a configuration such as whether an SRS is periodic/aperiodic, a bandwidth, and frequency/group/sequence hopping.

Synchronization acquisition of an SL UE will be described below.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 28:
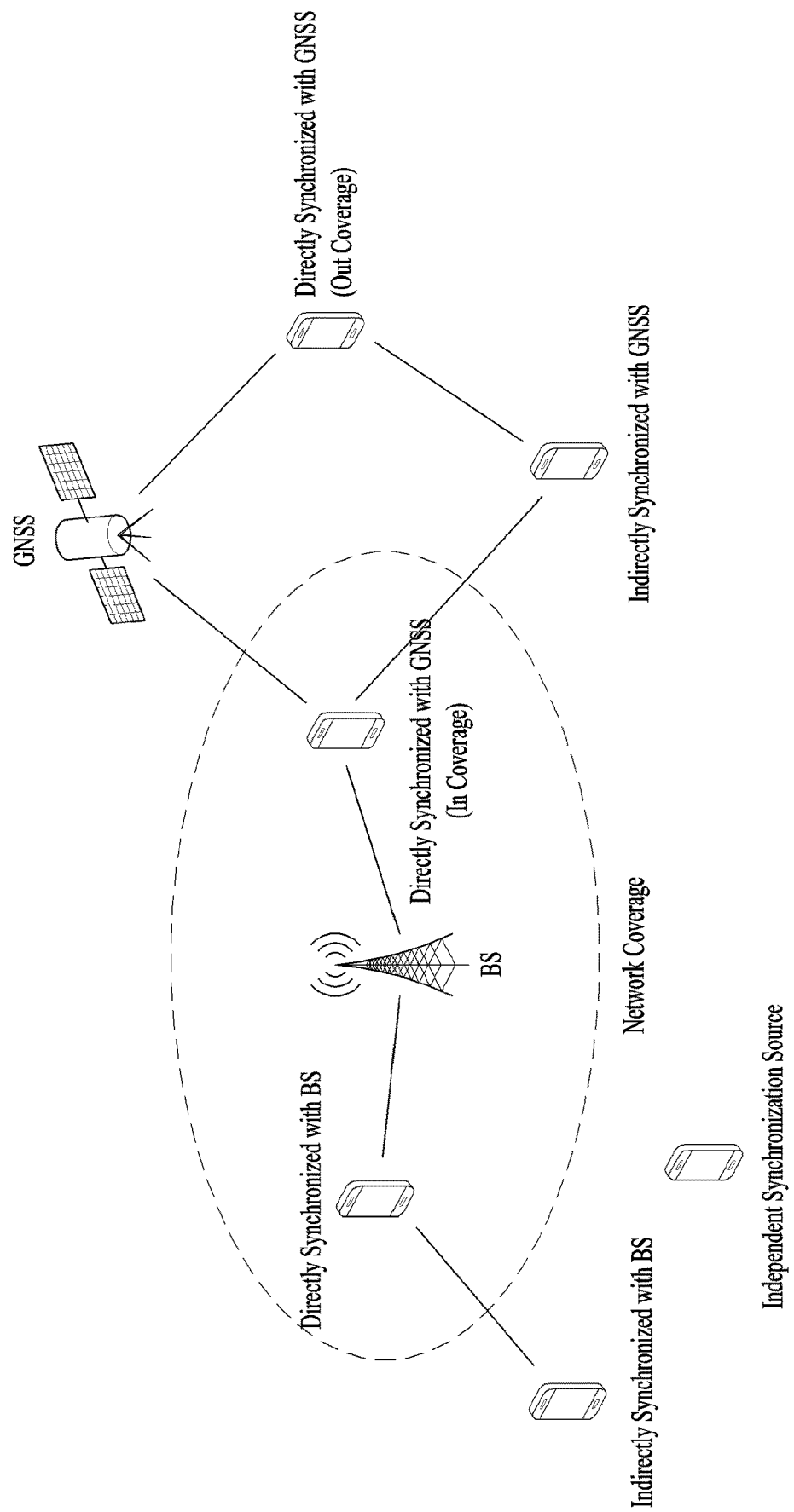
FIG. 28 is a diagram illustrating a synchronization source or synchronization reference in V2X according to an embodiment of the present disclosure.

FIG. 28 illustrates a synchronization source or synchronization reference of V2X according to an embodiment of the present disclosure.

Referring to FIG. 28, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 14] or [Table 15]. [Table 14] or [Table 15] is merely an example, and the relationship between synchronization sources and synchronization priorities may be defined in various manners.

TABLE 14

| PPriority level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 15

| PPriority level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 14] or [Table 15], P0 may represent a highest priority, and P6 may represent a lowest priority. In [Table 14] or [Table 15], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

A BWP and a resource pool will be described below.

When bandwidth adaptation (BA) is used, the reception bandwidth and transmission bandwidth of the UE need not be as large as the bandwidth of a cell, and may be adjusted. For example, the network/BS may inform the UE of the bandwidth adjustment. For example, the UE may receive information/a configuration for bandwidth adjustment from the network/BS. In this case, the UE may perform bandwidth adjustment based on the received information/configuration. For example, the bandwidth adjustment may include a decrease/increase of the bandwidth, a change in the position of the bandwidth, or a change in the SCS of the bandwidth.

For example, the bandwidth may be reduced during a time period of low activity in order to save power. For example, the position of the bandwidth may be shifted in the frequency domain. For example, the position of the bandwidth may be shifted in the frequency domain to increase scheduling flexibility. For example, the SCS of the bandwidth may be changed. For example, the SCS of the bandwidth may be changed to allow a different service. A subset of the total cell bandwidth of a cell may be referred to as a BWP. BA may be implemented by configuring BWPs for the UE and indicating a current active BWP among the configured BWPs to the UE by the BS/network.

Figure 29:
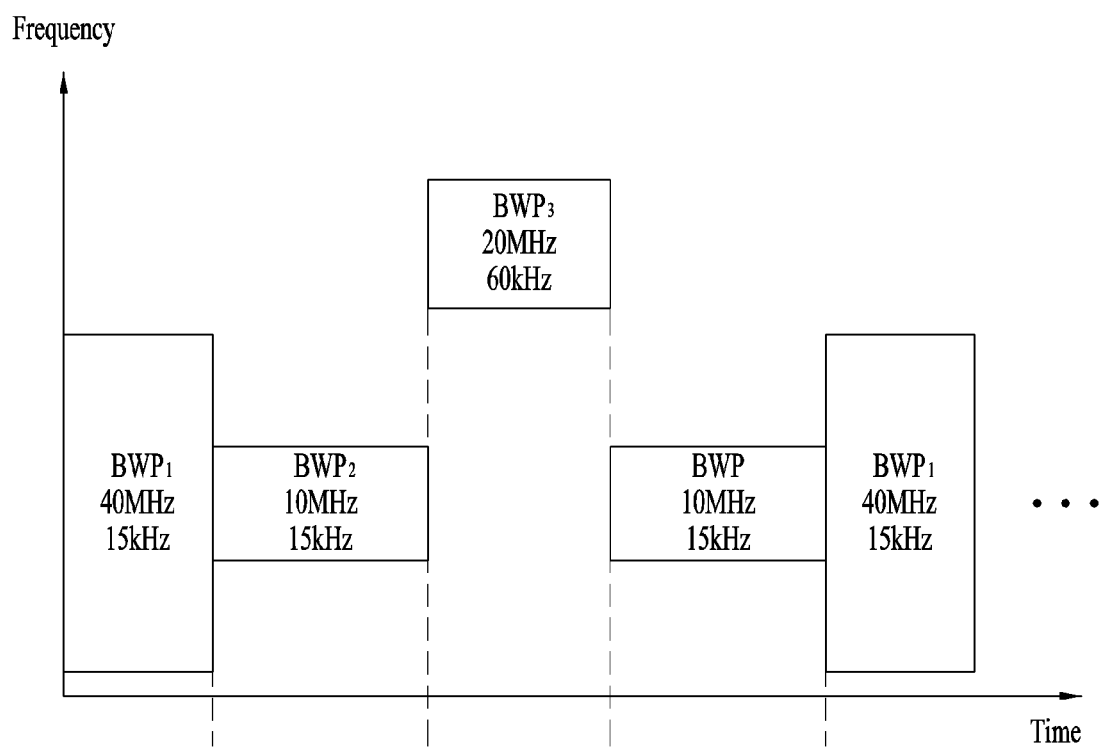
FIG. 29 is a diagram illustrating a plurality of bandwidth parts (BWPs) according to an embodiment of the present disclosure.

FIG. 29 illustrates a plurality of BWPs according to an embodiment of the present disclosure.

Referring to FIG. 29, BWP1 having a bandwidth of 40 MHz and an SCS of 15 kHz, BWP2 having a bandwidth of 10 MHz and an SCS of 15 kHz, and BWP3 having a bandwidth of 20 MHz and an SCS of 60 kHz may be configured.

Figure 30:
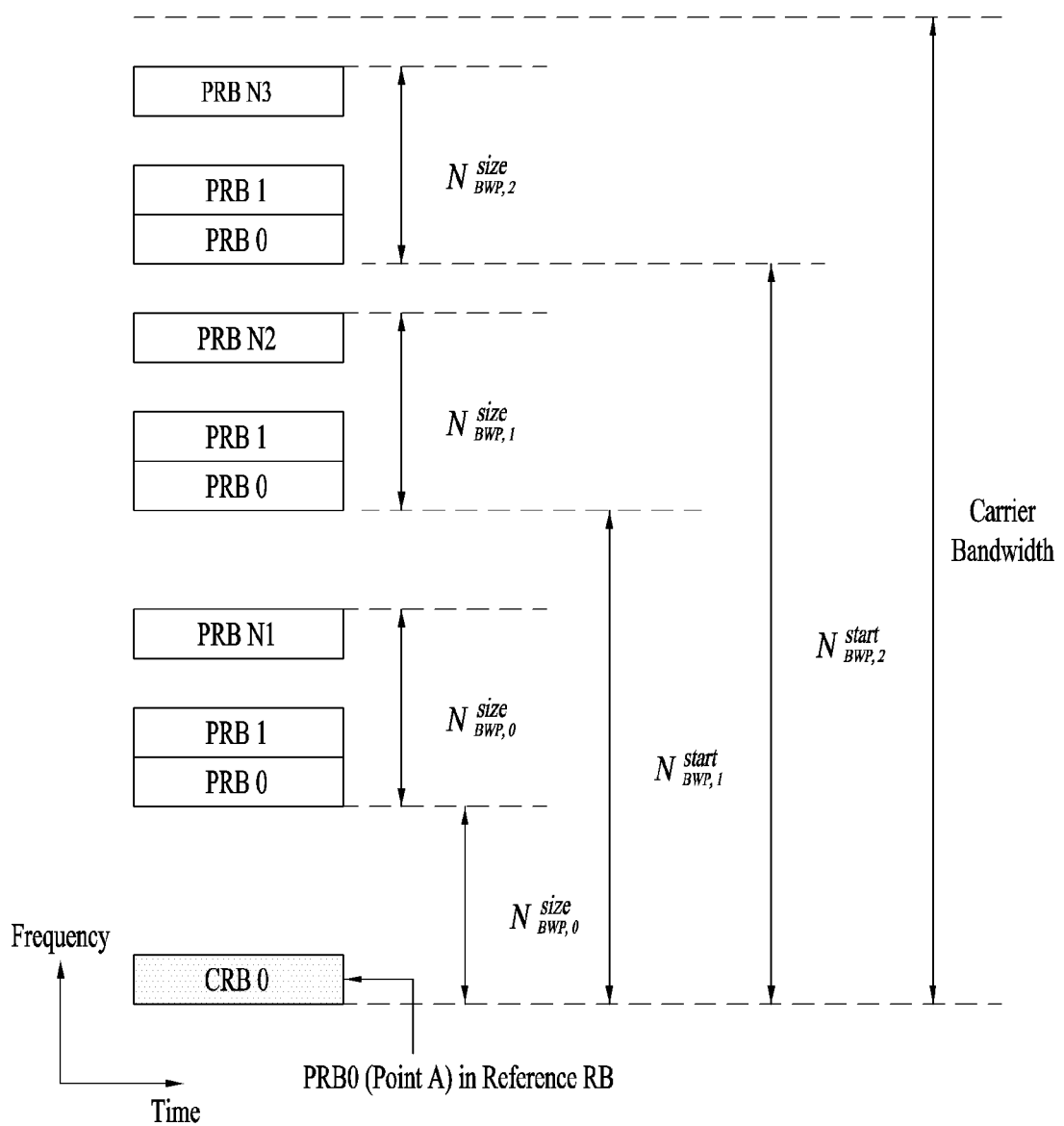
FIG. 30 is a diagram illustrating a BWP according to an embodiment of the present disclosure.

FIG. 30 illustrates BWPs according to an embodiment of the present disclosure. In the embodiment of FIG. 30, it is assumed that there are three BWPs.

Referring to FIG. 30, common resource blocks (CRBs) may be carrier RBs numbered from one end of a carrier band to the other end of the carrier band. PRBs may be RBs numbered within each BWP. A point A may indicate a common reference point for a resource block grid.

A BWP may be configured by the point A, an offset NstartBWP from the point A, and a bandwidth NsizeBWP. For example, the point A may be an external reference point for a PRB of a carrier, in which subcarrier 0 is aligned for all numerologies (e.g., all numerologies supported in the carrier by the network). For example, the offset may be a PRB interval between the lowest subcarrier for a given numerology and the point A. For example, the bandwidth may be the number of PRBs for the given technology.

A BWP may be defined for SL. The same SL BWP may be used for transmission and reception. For example, a transmitting UE may transmit an SL channel or an SL signal in a specific BWP, and a receiving UE may receive the SL channel or the SL signal in the specific BWP. In a licensed carrier, an SL BWP may be defined separately from a Uu BWP, and have separate configuration signaling from the Uu BWP. For example, a UE may receive a configuration for the SL BWP from the BS/network. The SL BWP may be (pre)configured for an out-of-coverage NR V2X UE and an RRC_IDLE UE in the carrier. For a UE in RRC_CONNECTED mode, at least one SL BWP may be activated in the carrier.

A resource pool may be a set of time-frequency resources available for SL transmission and/or SL reception. From the viewpoint of a UE, time-domain resources of a resource pool may not be contiguous. A plurality of resource pools may be (pre)configured for the UE in one carrier. From the viewpoint of the PHY layer, the UE may perform unicast, groupcast, and broadcast communication using a configured or preconfigured resource pool.

Now, a description will be given of power control.

Methods of controlling its UL transmission power at a UE may include open-loop power control (OLPC) and closed-loop power control (CLPC). According to OLPC, the UE may estimate a DL pathloss from the BS of the cell to which the UE belongs, and perform power control by compensating for the pathloss. For example, according to OLPC, when the distance between the UE and the BS is further increased and a DL pathloss is increased, the UE may control UL power by further increasing UL transmission power. According to CLPC, the UE may receive information (e.g., a control signal) required for adjusting UL transmission power from the BS, and control UL power based on the information received from the BS. That is according to CLPC, the UE may control the UL power according to a direct power control command received from the BS.

OLPC may be supported in SL. Specifically, when a transmitting UE is within the coverage of a BS, the BS may enable OLPC for unicast, groupcast, and broadcast transmissions based on a pathloss between the transmitting UE and a serving BS of the transmitting UE. When the transmitting UE receives information/a configuration from the BS to enable OLPC, the transmitting UE may enable OLPC for unicast, groupcast or broadcast transmissions. This may be intended to mitigate interference with UL reception of the BS.

Additionally, in the case of at least unicast, a configuration may be enabled to use a pathloss between the transmitting UE and the receiving UE. For example, the configuration may be preconfigured for the UEs. The receiving UE may report an SL channel measurement result (e.g., SL RSRP) to the transmitting UE, and the transmitting UE may derive a pathloss estimate from the SL channel measurement result reported by the receiving UE. For example, in the SL, when the transmitting UE transmits an RS to the receiving UE, the receiving UE may measure a channel between the transmitting UE and the receiving UE based on the RS transmitted by the transmitting UE. The receiving UE may transmit the SL channel measurement result to the transmitting UE. The transmitting UE may then estimate an SL pathloss from the receiving UE based on the SL channel measurement result. The transmitting UE may perform SL power control by compensating for the estimated pathloss, and perform SL transmission to the receiving UE. According to OLPC in SL, for example, when the distance between the transmitting UE and the receiving UE becomes greater and the SL pathloss becomes larger, the transmitting UE may control the SL transmission power by further increasing the transmission power of the SL. The power control may be applied for transmission of an SL physical channel (e.g., PSCCH, PSSCH, or PSFCH) and/or an SL signal.

To support OLPC, in the case of at least unicast, long-term measurements (i.e., L3 filtering) may be supported in the SL.

For example, a total SL transmission power may be equal in symbols used for PSCCH and/or PSSCH transmission in a slot. For example, a maximum SL transmission power may be preconfigured or configured for the transmitting UE.

For example, in the case of SL OLPC, the transmitting UE may be configured to use only a DL pathloss (e.g., a pathloss between the transmitting UE and the BS). For example, in the case of SL OLPC, the transmitting UE may be configured to use only an SL pathloss (e.g., a pathloss between the transmitting UE and the receiving UE). For example, in the case of SL OLPC, the transmitting UE may be configured to use a DL pathloss and an SL pathloss.

For example, when it is configured that both a DL pathloss and an SL pathloss are used for SL OLPC, the transmitting UE may determine, as transmission power, the minimum between power obtained based on the DL pathloss and power obtained based on the SL pathloss. The minimum value may be determined as the transmission power. For example, P0 and alpha values may be configured separately for the DL pathloss and the SL pathloss, or preconfigured. For example, P0 may be a user-specific parameter related to an average received SINR. For example, the alpha value may be a weight value for a pathloss.

SL congestion control will be described below.

When the UE autonomously determines SL transmission resources, the UE also autonomously determines the size and frequency of the resources used by itself. Obviously, due to constraints from the network, the use of resource sizes or frequencies above a certain level may be limited. However, in a situation in which a large number of UEs are concentrated in a specific region at a specific time point, when all the UEs use relatively large resources, overall performance may be greatly degraded due to interference.

Therefore, the UE needs to observe a channel condition. When the UE determines that excessive resources are being consumed, it is desirable for the UE to take an action of reducing its own resource use. In this specification, this may be referred to as congestion control. For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 31:
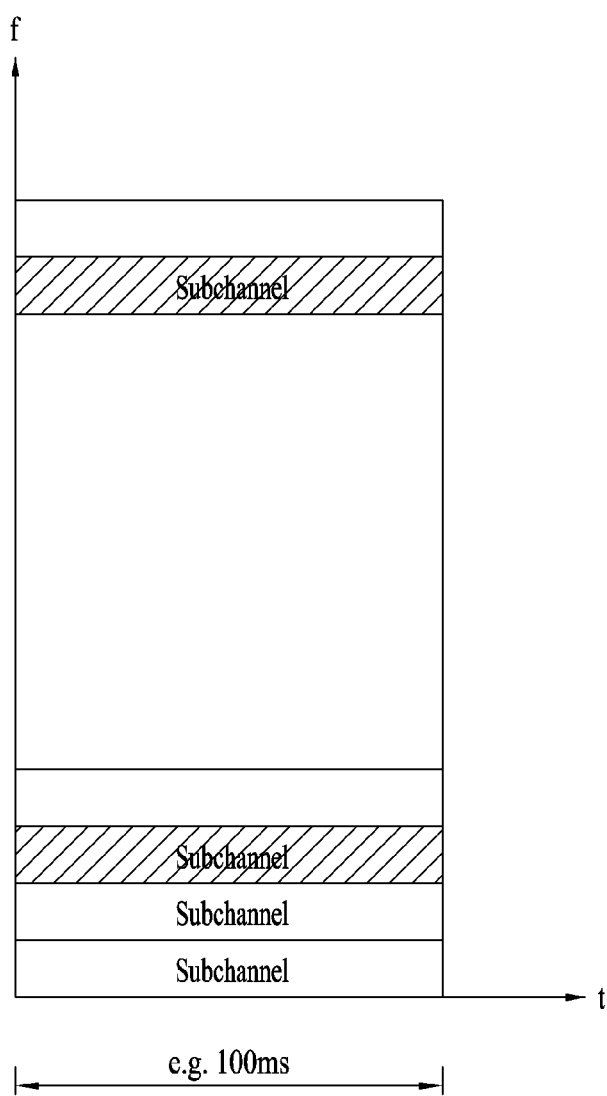
FIG. 31 is a diagram illustrating a resource unit for channel busy ratio (CBR) measurement according to an embodiment of the present disclosure.

FIG. 31 illustrates resource units for CBR measurement according to an embodiment of the present disclosure.

Referring to FIG. 31, a CBR may refer to the number of subchannels of which the RSSI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 31, on the assumption that the hatched subchannels have values greater than or equal to a predetermined threshold, the CBR may refer to a ratio of hatched subchannels for a time period of 100 ms. In addition, the UE may report the CBR to the BS.

Figure 32:
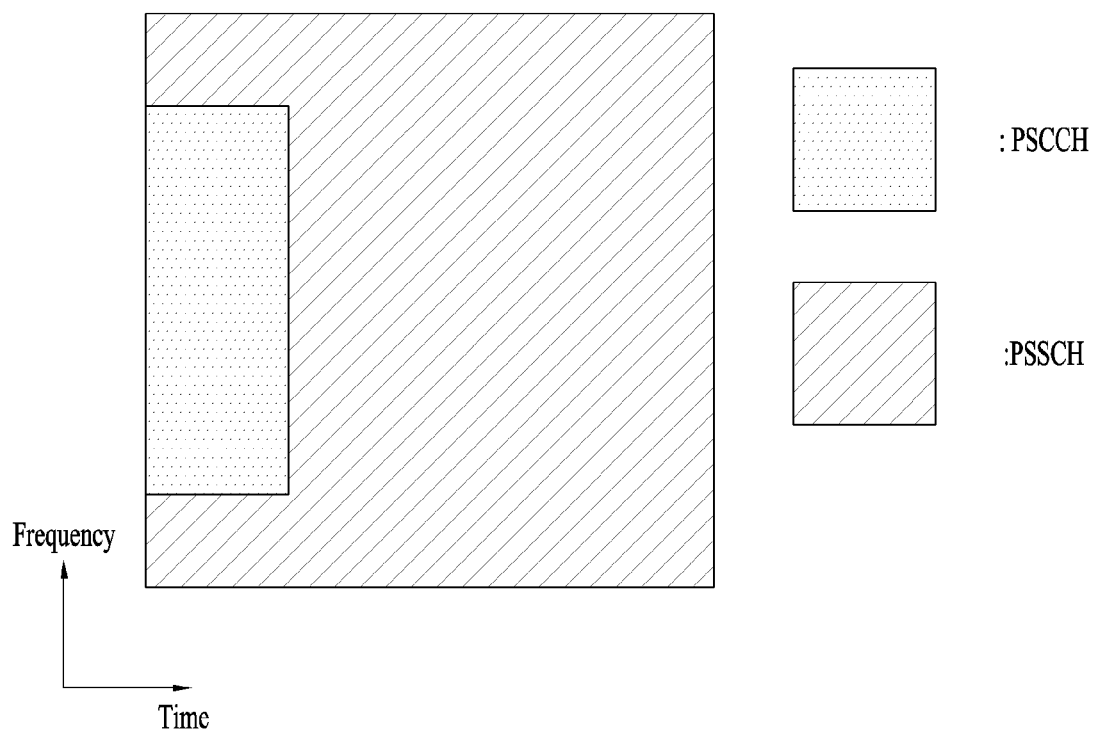
FIG. 32 is a diagram illustrating exemplary multiplexing between a physical sidelink control channel (PSCCH) and a physical sidelink shared channel (PSSCH).

For example, when a PSCCH and a PSSCH are multiplexed as illustrated in the embodiment of FIG. 32, the UE may perform one CBR measurement in one resource pool. When PSFCH resources are configured or preconfigured, the PSFCH resources may be excluded from the CBR measurement.

Further, there may be a need for performing congestion control in consideration of the priority of traffic (e.g., a packet). To this end, for example, the UE may measure a channel occupancy ratio (CR). Specifically, the UE may measure a CBR and determine a maximum value CRlimitk of a CR k (CRk) available for traffic corresponding to each priority (e.g., k) according to the CBR. For example, the UE may derive the maximum value CRlimitk of the channel occupancy ratio for the priority of traffic, based on a predetermined table of CBR measurements. For example, for relatively high-priority traffic, the UE may derive a relatively large maximum value of a channel occupancy ratio. Thereafter, the UE may perform congestion control by limiting the sum of the channel occupancy ratios of traffic with priorities k lower than i to a predetermined value or less. According to this method, a stricter channel occupancy ratio limit may be imposed on relatively low-priority traffic.

Besides, the UE may perform SL congestion control by using a scheme such as transmission power adjustment, packet dropping, determination as to whether to retransmit, and adjustment of a transmission RB size (MCS adjustment).

PHY-layer processing for SL will be described below.

Figure 33:
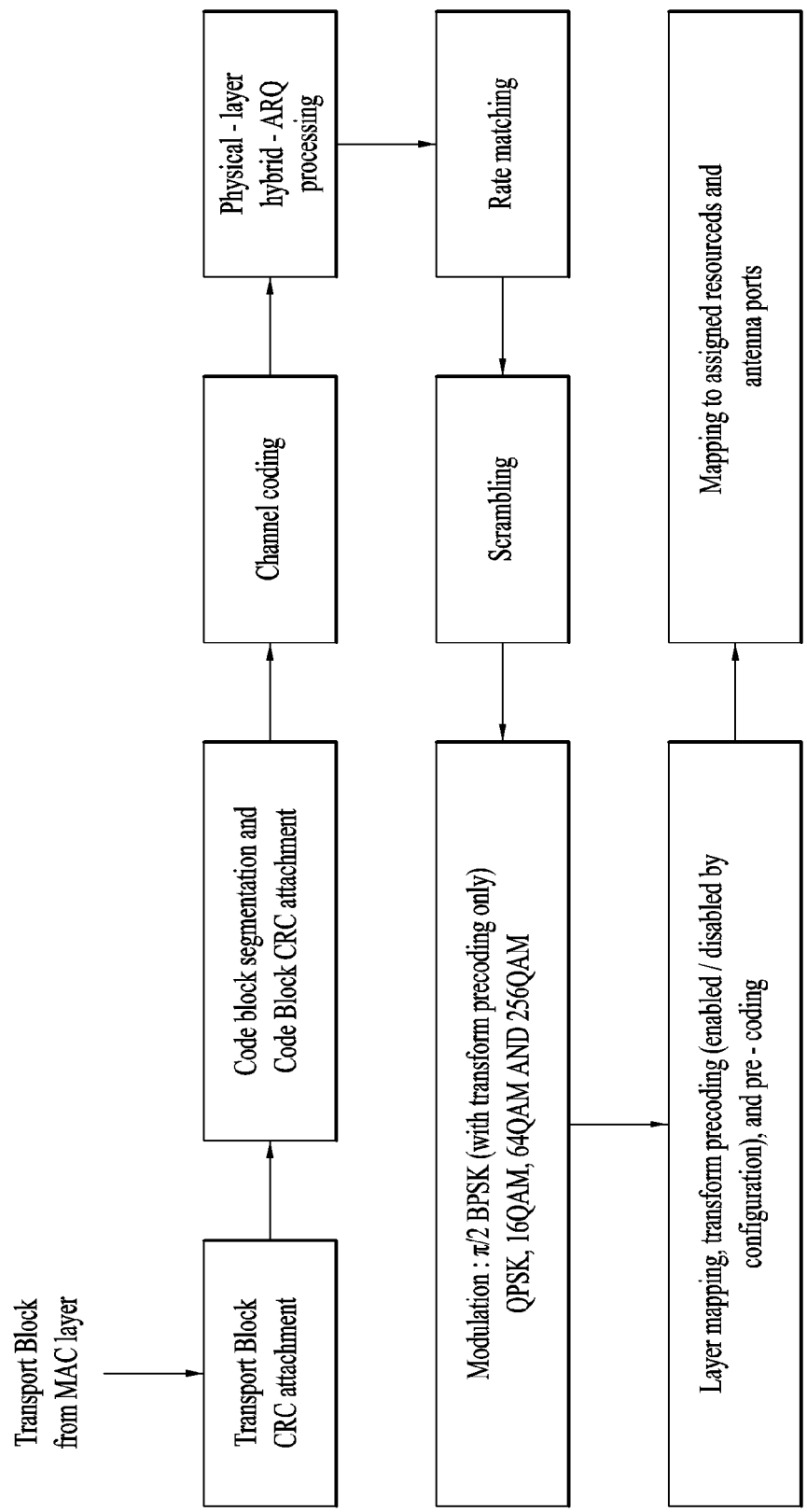
FIG. 33 is a diagram illustrating PHY-layer processing for SL according to an embodiment of the present disclosure.

FIG. 33 illustrates PHY-layer processing for SL, according to an embodiment of the present disclosure.

The UE may split a long TB into a plurality of short CBs. After the UE encodes each of the plurality of short CBs, the UE may combine the plurality of short CBs into one CB again. The UE may then transmit the combined CB to another UE.

Specifically, referring to FIG. 33, the UE may first perform a CRC encoding process on a long TB. The UE may attach a CRC to the TB. Subsequently, the UE may divide the full-length TB attached with the CRC into a plurality of short CBs. The UE may perform the CRC encoding process on each of the plurality of short CBs again. The UE may attach a CRC to each of the CBs. Accordingly, each CB may include a CRC. Each CB attached with a CRC may be input to a channel encoder and channel-encoded. Thereafter, the UE may perform rate matching, bitwise scrambling, modulation, layer mapping, precoding, and antenna mapping for each CB, and transmit the CBs to a receiving end.

In addition, the channel coding scheme described with reference to FIGS. 21 and 22 may be applied to SL. For example, UL/DL physical channels and signals described with reference to FIGS. 21 and 22 may be replaced with SL physical channels and signals. For example, channel coding defined for a data channel and a control channel at NR Uu may be defined similarly to channel coding for a data channel and a control channel on NR SL, respectively.

Figure 34:
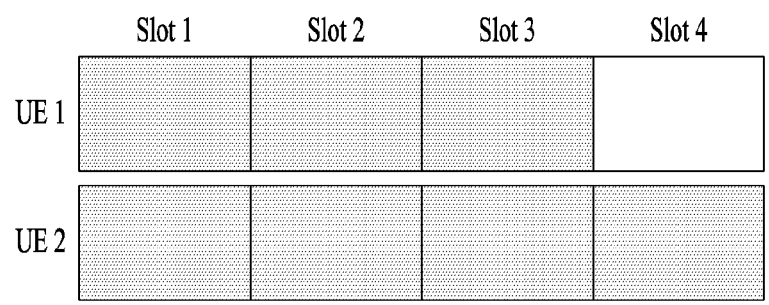
FIGS. 34 to 36 are diagrams illustrating the embodiment (s).
Figure 34:
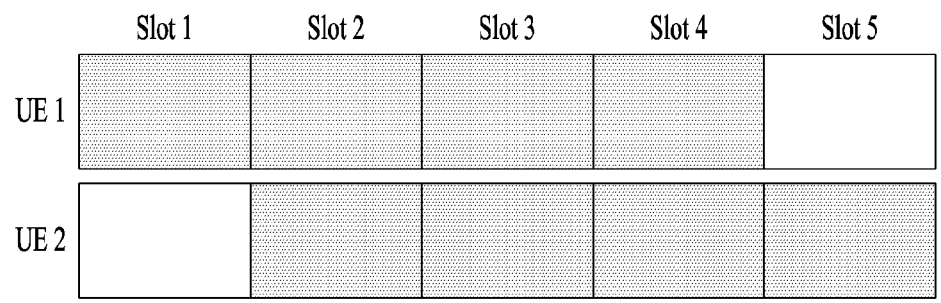

On the other hand, if a slot format having a flexible subcarrier spacing (SCS) and a frequency range (FR) is introduced in NR sidelink (SL), the length of one OFDM symbol varies depending on the SCS and the FR. In particular, in the case of FR2, the length of one OFDM symbol is reduced so that the number of OFDM symbols required for AGC operation within one slot may increase. For example, in the case of FR2, if the time required for the AGC operation at the SCS 120 kHz is set to 70 us, at least one slot is always discarded and the amount of overhead is too large. In order to reduce such overhead, a method for grouping a plurality of slots according to the frequency range (FR) and/or the subcarrier spacing (SCS) and scheduling/sensing the grouped slots may be used in NR SL. For example, in FR2, in order to increase the number of OFDM symbols present in the transmission unit, two slots are always grouped into one unit and are then scheduled/sensed. In this way, an exemplary case in which two or more slots are transmitted in one unit will be referred to as slot aggregation. As described above, when the slot aggregation is configured (or pre-configured) in a resourcepool, different UEs may exist in a slot duration. For example, in the case of a UE1, three slots may constitute the aggregation set. In the case of a UE2, four slots may constitute the aggregation set. In this case, as shown in FIG. 34(a), a data transmission interval (UE 2) and another transmission interval (UE 1) in which no data is transmitted may exist at a predetermined time t (e.g., Slot 4 of FIG. 34(a)). As another example, although the same slot duration is used as shown in FIG. 34(b) (for example, the aggregation set is composed of 4 slots), if a boundary for slot aggregation between different UEs is not aligned, a data transmission interval and a data non-transmission interval may exist at a predetermined time point (e.g., Slot 1 and Slot 5 of FIG. 34(b)). In addition, whereas UE1 transmits data, UE2 does not transmit data because the aggregated slot does not begin. In addition, in the case of Slot 5, whereas the aggregated slot is ended so that there is no data transmission, UE2 performs data transmission.

In this case, when a reception UE (RX UE) receives data from a TX UE1 and a TX UE2, the RX UE should handle the ambiguity of the AGC operation at a frequency division multiplexing (FDM) portion (Slot 4 of FIG. 34(a), and Slot 1 and Slot 5 of FIG. 34(b)) between a gap and data. In addition, in slot aggregation, the TX UE may perform repetition of a single TB within the corresponding aggregation set and may transmit the repeated TBs, resulting in reliability improvement. Alternatively, in order to transmit data having a large payload size, a plurality of TB s can be transmitted. Alternatively, a single TB repetition and transmission of a plurality of TBs can be simultaneously considered (hybrid transmission). As described above, the RX UE has disadvantages in that the RX UE should determine which method will be used for TB transmission at a slot belonging to the aggregation set. In additi during slot aggregation, in order to reduce overhead of control information, a PSCCH can be transmitted only in a first slot belonging to the aggregation set. However, in this case, if decoding of the corresponding PSCCH is failed, it is impossible for the RX UE to recognize all information of the corresponding aggregation set (e.g., the number f slots constituting the set, information about transmission of one or more TBs, etc.). In a situation where the RX UE has to receive data (or has to transmit data) when data is transmitted (or received) within the slot aggregation, how to perform TX/RX switching should be solved. Therefore, according to one embodiment, a method for solving various issues capable of being generated in slot aggregation and a device for supporting the same are proposed.

Figure 35:
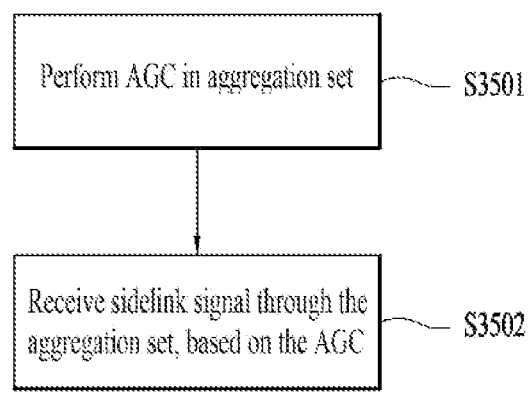

The RX UE according to one embodiment may perform automatic gain control (AGC) in the aggregation set (S3501 of FIG. 35), and may receive a sidelink signal through the aggregation based on the AGC (S3502 of FIG. 35). In this case, the aggregation set may begin from a predetermined slot related to the number of slots included in the aggregation set. In this case, when the RX UE receives data from TX UE1 and TX UE2, the ambiguity for the AGC operation may be reduced at the FDM portion between the gap and the data, the number of AGC operations may be reduced in the aggregation set, and many more symbols can be allocated to data transmission within the corresponding set. In this case, in the FDM portion between the gap and data, since start points of the respective slot aggregation sets of different UEs are not identical to each other in (sidelink) transmission based on slot aggregation, the FDM portion refers to a slot in which one UE transmits data and the other UE does not transmit data.

From the viewpoint of the TX UE, the TX UE can transmit a sidelink signal through the aggregation set. In this case, the start position of the aggregation set, PSCCH transmission, and TB transmission through the aggregation set may comply with the description of the RX UE.

Figure 36:
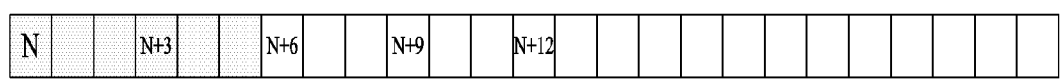
Figure 36:
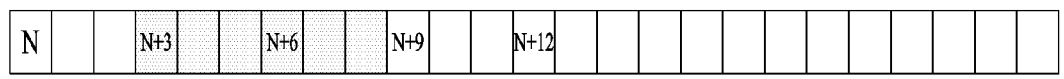
Figure 36:
Figure 37:
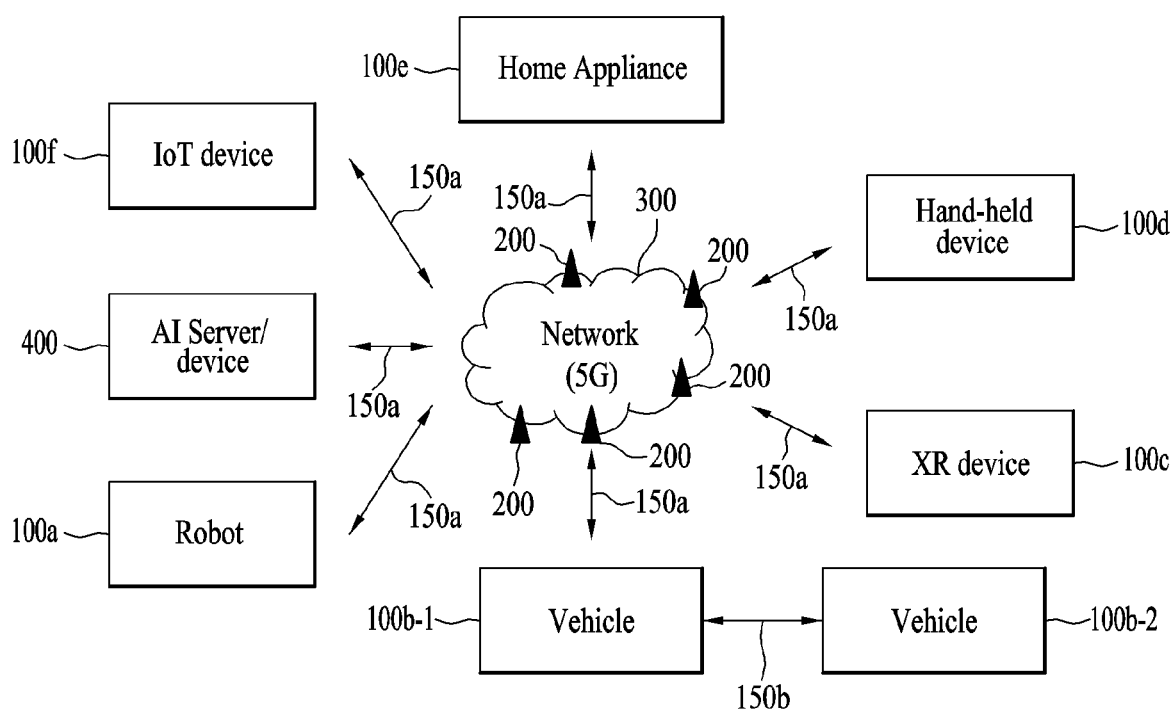
FIGS. 37 to 46 are block diagrams illustrating various devices to which embodiment(s) of the present disclosure are applicable.
Figure 38:
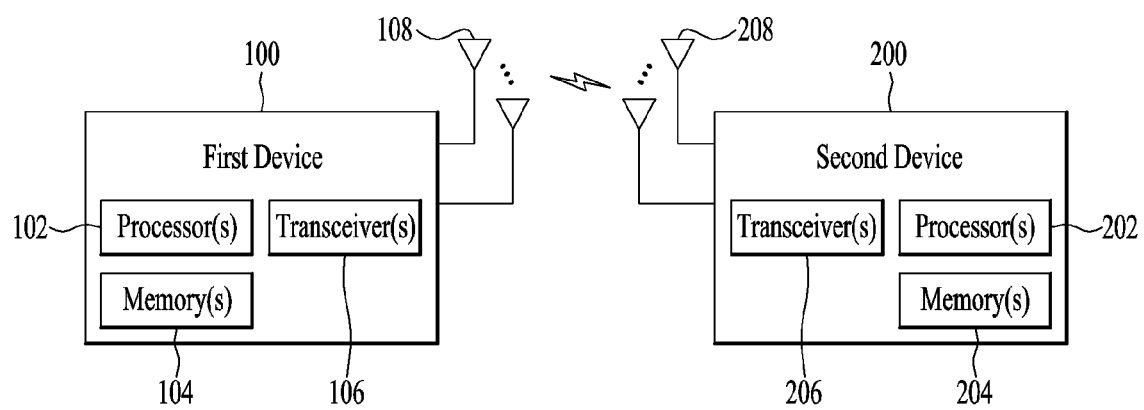
Figure 39:
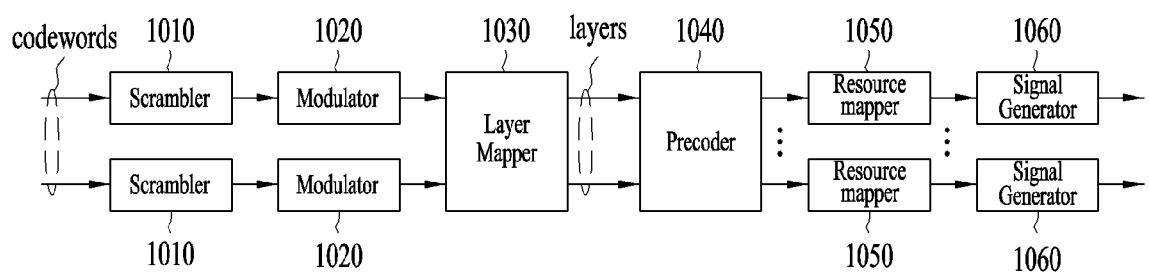

Continuously, the predetermined slot may be a slot corresponding to the number (1/K) of slots (where K is a natural number, for example, K=2) from the slot N. At this time, the slot where the aggregation set can be started may be configured in advance, and the aggregation set may begin only from the corresponding slot. In this case, the period in which the slot is started may be associated with the number of slots constituting the aggregation set. For example, as shown in FIG. 36, when the aggregation set is composed of 6 slots, the aggregation set may be started only at slots N, N+3, N+6, N+9, . . . , etc. In this case, the same number of slots constituting the aggregation set belonging to the resource pool may be used, and the AGC operation is required in slots corresponding to the half of the number of slots constituting the aggregation set.

The above-described example may perform allowance of some parts of data FDM between the gap of TX UE1 and data of TX UE2. In contrast, data FDM between the gap of TX UE1 and data of TX UE2 may not be allowed. That is the boundary between different UEs may not be aligned within the resource pool. In this case, the AGC operation in the aggregation set is necessary. For example, a first slot of the aggregation set may always be started only in the same slot. In this case, the same number of slots constituting the aggregation set contained in the resource pool may be used. As another example, when the aggregation set of UE1 is started at the slot N, data transmission of other UEs may not be considered in the corresponding set duration.

As another example, data FDM between the gap of TX UE1 and the data of TX UE2 may always be allowed. In this case, the AGC operation may always be performed for each slot in the aggregation set.

On the other hand, based on occurrence of data to be transmitted by the RX UE in the aggregation set, if a predetermined condition is satisfied, TX/RX switching may be performed for data transmission. Here, the predetermined condition may refer to a state in which the ratio of a time from the start slot of the aggregation set to the other slot in which the data is generated to a total time corresponding to the aggregation set is equal to or less than a predetermined threshold value. That is if a time from the beginning of aggregation to the present time is equal to or less than a predetermined threshold value, the TX/RX switching operation may be performed. In a state in which data is transmitted (or received) in the last slot aggregation, if there occurs a situation in which data should be received (or should be transmitted), one example of a method for performing TX/RX switching in consideration of latency is shown.

As another example, 1) TX UE may immediately perform TX/RX switching (for example, in the next slot of a slot where data is received). In another example, 2) TX UE may perform TX/RX switching according to a predetermined condition. That is if the number of slots where TX/RX switching should be performed is equal to or less than a predetermined number of threshold slots, the TX/RX switching operation can be performed.

The TX/RX switching operation may be activated using the last symbol of the corresponding slot. That is the TX/RX switching operation may be performed on a slot basis. The TX/RX switching operation may be performed using the last symbol present in the corresponding set. The above-described TX/RX switching operation may be configured by latency budget or the like of data to be received (or transmitted).

In the aggregation set, the PSCCH can be transmitted using at least one of the following methods. As an example, the PSCCH may be transmitted at an odd slot (e.g., a first or third slot). If PSCCH is transmitted only once, when decoding of the PSCCH is failed, information of the corresponding set (e.g., the number of slots constituting the set, information about transmission of one or more TBs, etc.) cannot be recognized. In order to address this issue, the PSCCH should be transmitted multiple times. In this case, information (for example, a position where the slot to be used for PSCCH transmission is located within theset, the number of all slots belonging to the set, etc.) of the slot located before (or after) the aggregation set is included in each PSCCH to be transmitted can be utilized for improvement of PSCCH sensing performance. That is when the aggregation set is corrrposed of four slots, the PSCCH can be transmitted at each of the first and third slots. The PSCCH may include at least one of information about the position where the PSCCH is located in the aggregation set, information about the number of slots located before the PSCCH within the aggregation set, and the number of slots after the PSCCH within the aggregation set. The PSCCH may include information (e.g., the corresponding PSCCH is the N-th PSCCH that has been sent at the corresponding aggregation set) about the corresponding PSCCH, information (e.g., the A number of previous slots are slots belonging to the corresponding aggregation set) about the previous aggregation set, and/or informal (e the B number of subsequentslots are slots belonging to the corresponding aggregation set) about the subsequent aggregation set.

As an example in which the PSCCH is transmitted several times within the aggregation set, the PSCCH can be transmitted in the first slot and the middle slot within the set. That is in the case of using the set composed of N (N: odd number) slots, the PSCCH can be transmitted at the first and third slots (N+1/2) or (N+1)/2. In the case of using the set composed of M (M: even number) slots, the PSCCH can be transmitted at the first and fourth slots (M/2) or (M/2+1). In another example, the PSCCH may be transmitted at the first slot, and may then be transmitted at intervals of N slots (where N≥2). That is assuming that the aggregation set s composed of 6 slots and N is set to 2 (n=2), the PSCCH may be transmitted at each of the first, third, and third slots. In another example, the PSCCH can be transmitted for each slot within the aggregation set.

The above-described number of transmissions of the PSCCH may be determined in consideration of reliability, latency, etc. of the message to be transmitted by the TX UE.

As another example, in order to reduce overhead of control information within the aggregation set, the PSCCH may be transmitted only in the first slot within the aggregation set.

On the other hand, the odd slots and the even slots in the aggregation set may be transmitted with different transmission blocks (TB). Single TB repetition and multiple TB transmissions can be considered as hybrid transmission. For example, each TB may be repeated and transmitted in each even symbol and each odd symbol within the aggregation set (composed of a total of N slots). That is in the case of using the set composed of N (where N is an odd number) slots, the same TB (TB1) may be transmitted at the first, third, . . . N-th slots, and the other TB (TB2) may be transmitted at the second, fourth, . . . , (N−1)-th slots. In the case of using the set composed of M (where M is an even number) slots, the same TB (TB1) may be transmitted at the first, third, . . . , (M−1)-th slot, and the other TB (TB2) may be transmitted at the second, fourth, . . . , M-th slots. As another example, some consecutive slots from among the aggregation set may be used for transmission of the same TB, and the remaining consecutive slots may be used for transmission of another TB. That is in the case of using the set composed of N slots (where N is an odd number), the same TB (TB1) may be repeated and transmitted within the range from the first slot to the (N+1/2) (or N−1/2) slot, and the other TB (TB2) may be repeated and transmitted within the range from the subsequent (N+1/2)+1 (or N+1/2) slot to the N-th slot. In the case of using the set composed of M slots (where M is an even number), the same TB (TB1) may be repeated and transmitted within the range from the first slot to the (M/2) slot, and the other TB (TB2) may be repeated and transmitted within the range from the (M/2+1) slot to the M-th slot.

As another example, 1) TX UE may perform repetition of the single TB within the corresponding aggregation set in terms of reliability improvement.

Alternatively, 2) in order to transmit data having a large payload size, a plurality of TBs can be transmitted.

The above-mentioned TB transmission method may be established by interacting with the priority field contained in the PSCCH of the TX UE. That is the TX UE may configured (or pre-configure) the configured TB structure and/or the repetition information for each priority field.

Examples of Communication Systems Applicable to the Present Disclosure

The various descriptions, functions, procedures, proposals, methods, and/or operational flowcharts of the present disclosure described in this document may be applied to without being limited to a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 45:
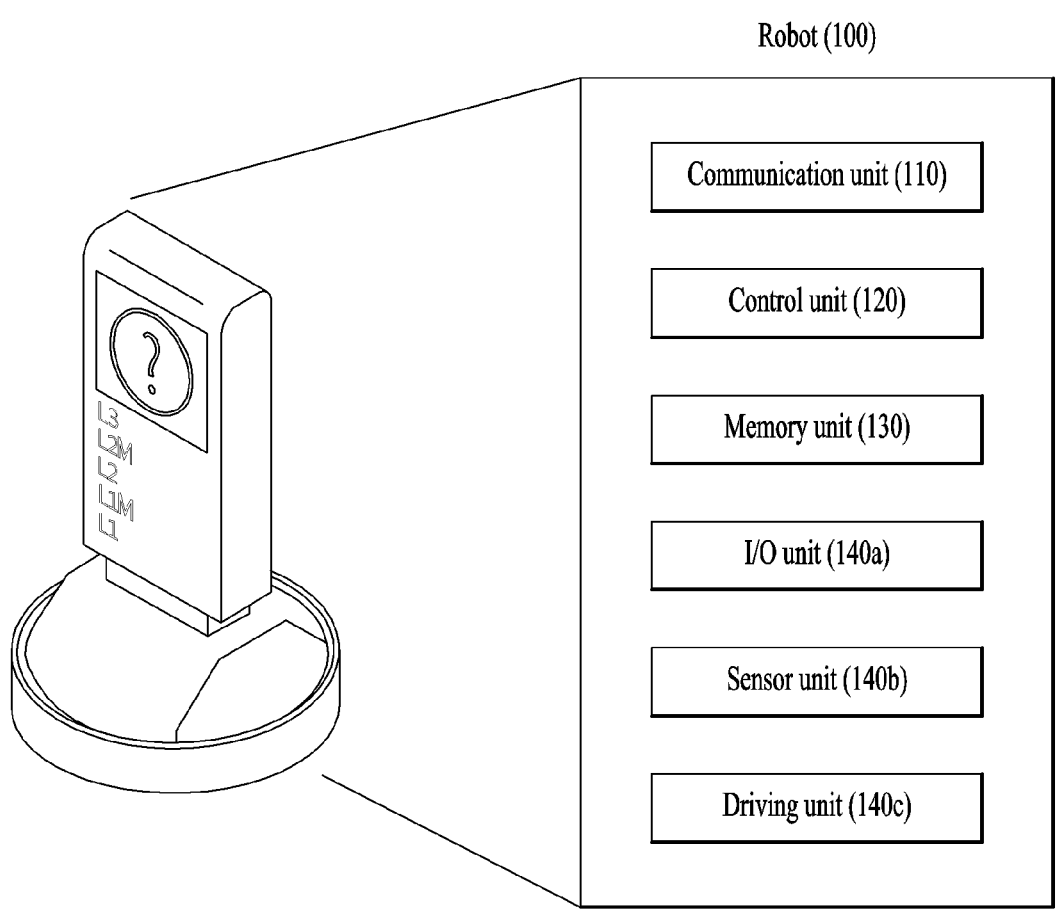

FIG. 45 illustrates a communication system 1 applied to the present disclosure.

Referring to FIG. 45, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 46:
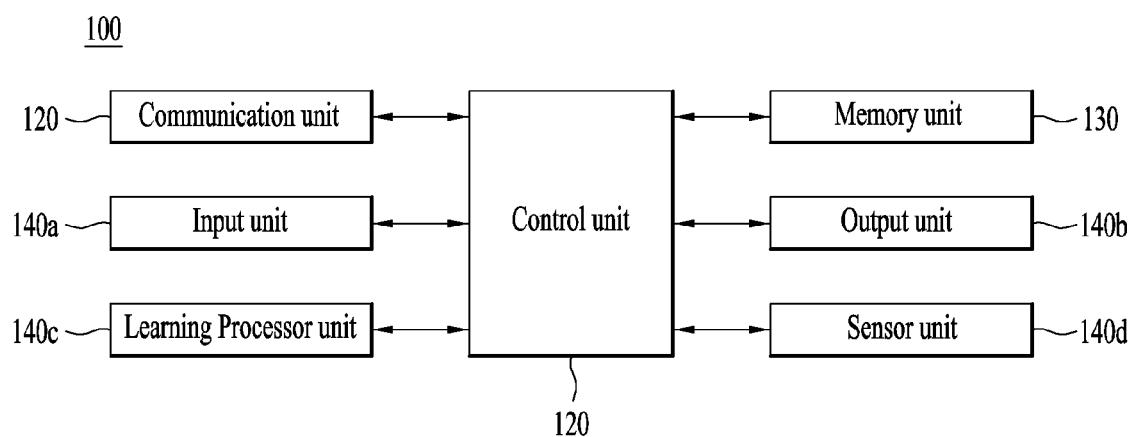

FIG. 46 illustrates wireless devices applicable to the present disclosure.

Referring to FIG. 46, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 45.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Signal Process Circuit Applicable to the Present Disclosure

FIG. 47 illustrates a signal process circuit for a transmission signal.

Referring to FIG. 47, a signal processing circuit 1000 may include scramblers 1010, modulators 1020, a layer mapper 1030, a precoder 1040, resource mappers 1050, and signal generators 1060. An operation/function of FIG. 47 may be performed, without being limited to the processors 102 and 202 and/or the transceivers 106 and 206 of FIG. 46. Hardware elements of FIG. 47 may be implemented by the processors 102 and 202 and/or the transceivers 106 and 206 of FIG. 46. For example, blocks 1010 to 1060 may be implemented by the processors 102 and 202 of FIG. 46. Alternatively, the blocks 1010 to 1050 may be implemented by the processors 102 and 202 of FIG. 46 and the block 1060 may be implemented by the transceivers 106 and 206 of FIG. 46.

Codewords may be converted into radio signals via the signal processing circuit 1000 of FIG. 47. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 47. For example, the wireless devices (e.g., 100 and 200 of FIG. 46) may receive radio signals from the exterior through the antenna ports/transceivers. The received radio signals may be converted into baseband signals through signal restorers. To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Application of Wireless Device Applicable to the Present Disclosure

FIG. 48 illustrates another example of a wireless device applied to the present disclosure. The wireless device may be implemented in various forms according to a use-case/service (refer to FIG. 45).

Referring to FIG. 48, wireless devices 100 and 200 may correspond to the wireless devices 100 and 200 of FIG. 46 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 46. For example, the transceiver(s) 114 may include the one or more transceivers 106 and 206 and/or the one or more antennas 108 and 208 of FIG. 46. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to the robot (100*a* of FIG. 45), the vehicles (100*b*-1 and 100*b*-2 of FIG. 45), the XR device (100*c* of FIG. 45), the hand-held device (100*d* of FIG. 45), the home appliance (100*e* of FIG. 45), the IoT device (100*f* of FIG. 45), a digital broadcast terminal, a hologram device, a public safety device, an MTC device, a medicine device, a FinTech device (or a finance device), a security device, a climate/environment device, the AI server/device (400 of FIG. 45), the BSs (200 of FIG. 45), a network node, etc. The wireless device may be used in a mobile or fixed place according to a use-example/service.

In FIG. 48, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Hereinafter, an example of implementing FIG. 48 will be described in detail with reference to the drawings.

Examples of a Hand-Held Device Applicable to the Present Disclosure

FIG. 49 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 49, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 48, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Examples of a Vehicle or an Autonomous Driving Vehicle Applicable to the Present Disclosure FIG. 50 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 50, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 48, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

FIG. 51 illustrates a vehicle applied to the present disclosure. The vehicle may be implemented as a transport means, an aerial vehicle, a ship, etc.

Referring to FIG. 51, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 48.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

FIG. 52 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 52, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 48, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100b and generate and output an XR object corresponding to the hand-held device 100b.

Examples of a Robot Applicable to the Present Disclosure

FIG. 53 illustrates a robot applied to the present disclosure. The robot may be categorized into an industrial robot, a medical robot, a household robot, a military robot, etc., according to a used purpose or field.

Referring to FIG. 53, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 48, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI Device to which the Present Disclosure is Applied.

FIG. 54 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 54, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 48, respectively.

The communication unit 110 may transmit and receive wired/radio signals (e.g., sensor information, user input, learning models, or control signals) to and from external devices such as other AI devices (e.g., 100x, 200, or 400 of FIG. 45) or an AI server (e.g., 400 of FIG. 45) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 45). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 45). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-described embodiments of the present disclosure are applicable to various mobile communication systems.

The invention claimed is:

1. A method for operating a reception (RX) user equipment (UE) in a wireless communication system comprising:
   performing, by the RX UE, automatic gain control (AGC) in an aggregation set; and
   receiving, by the RX UE from one of TX UE among two or more TX UEs, a sidelink signal through the aggregation set based on the AGC,
   wherein the two or more TX UEs have same number of slots in each of aggregation sets, wherein the aggregation set starts from a predetermined slot associated with the number of slots included in the aggregation set, and wherein the predetermined slot is a slot corresponding to one of a multiple of (the number of slots included in the aggregation set/2) starting from the slot N.

2. The method according to claim 1, further comprising:
based on a state in which data to be transmitted by the RX UE is generated in the aggregation set, performing TX/RX switching for transmission of the data when a predetermined condition is satisfied.

3. The method according to claim 2, wherein:
the predetermined condition indicates that a ratio of a duration time starting from a start slot of the aggregation set to a slot where the data is generated to an entire time corresponding to the aggregation set is equal to or less than a predetermined threshold value.

4. The method according to claim 1, wherein:
a PSCCH in the aggregation set is transmitted at an odd slot.

5. The method according to claim 4, wherein the PSCCH includes at least one of:
information indicating which one of PSCCHs in the aggregation set is used;
the number of slots located before the PSCCH within the aggregation set; and
the number of slots located after the PSCCH within the aggregation set.

6. The method according to claim 1, wherein:
in the aggregation set, an odd slot and an even slot are configured to transmit different transport blocks (TBs).

7. A device for use in a wireless communication system comprising:
at least one processor; and
at least one computer memory operatively connected to the at least one processor, and configured to store instructions such that the at least one processor performs specific operations by executing the instructions, wherein the specific operations include:
performing, by the RX UE, automatic gain control (AGC) in an aggregation set; and
receiving, by the RX UE from one of TX UE among two or more TX UEs, a sidelink signal through the aggregation set based on the AGC,
wherein the two or more TX UEs have same number of slots in each of aggregation sets,
wherein the aggregation set starts from a predetermined slot associated with the number of slots included in the aggregation set, and
wherein the predetermined slot is a slot corresponding to one of a multiple of (the number of slots included in the aggregation set/2) starting from the slot N.

8. The device according to claim 7, wherein the specific operations further include:
based on a state in which data to be transmitted by the RX UE is generated in the aggregation set, performing TX/RX switching for transmission of the data when a predetermined condition is satisfied.

9. The device according to claim 8, wherein:
the predetermined condition indicates that a ratio of a duration time starting from a start slot of the aggregation set to a slot where the data is generated to an entire time corresponding to the aggregation set is equal to or less than a predetermined threshold value.

10. The device according to claim 7, wherein:
a PSCCH in the aggregation set is transmitted at an odd slot.

11. The device according to claim 10, wherein the PSCCH includes at least one of:
information indicating which one of PSCCHs in the aggregation set is used;
the number of slots located before the PSCCH within the aggregation set; and
the number of slots located after the PSCCH within the aggregation set.

12. The device according to claim 7, wherein:
in the aggregation set, an odd slot and an even slot are configured to transmit different transport blocks (TBs).

13. The device according to claim 7, wherein:
the RX UE is configured to communicate with at least one of another terminal, a terminal related to an autonomous vehicle, a base station (BS), and a network.

* * * * *